United States Patent
Brennan et al.

(10) Patent No.: US 10,221,274 B2
(45) Date of Patent: Mar. 5, 2019

(54) POLYURETHANES, ARTICLES COMPRISING THE SAME AND METHODS OF MANUFACTURE THEREOF

(71) Applicant: UNIVERSITY OF FLORIDA RESEARCH FOUNDATION, INC., Gainesville, FL (US)

(72) Inventors: Anthony B. Brennan, Gainesville, FL (US); Laura M. Villada, Gainesville, FL (US); Canan Kizilkaya, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 0 days.

(21) Appl. No.: 15/322,334

(22) PCT Filed: Jun. 25, 2015

(86) PCT No.: PCT/US2015/037626
§ 371 (c)(1),
(2) Date: Dec. 27, 2016

(87) PCT Pub. No.: WO2015/200591
PCT Pub. Date: Dec. 30, 2015

(65) Prior Publication Data
US 2017/0152338 A1    Jun. 1, 2017

Related U.S. Application Data

(60) Provisional application No. 62/016,877, filed on Jun. 25, 2014.

(51) Int. Cl.
| | | |
|---|---|---|
| *C08F 290/06* | (2006.01) | |
| *C08F 220/68* | (2006.01) | |
| *C09D 175/16* | (2006.01) | |
| *C08G 71/04* | (2006.01) | |
| *C08F 222/10* | (2006.01) | |

(52) U.S. Cl.
CPC ........ *C08F 290/067* (2013.01); *C08F 220/68* (2013.01); *C08F 222/1006* (2013.01); *C08G 71/04* (2013.01); *C09D 175/16* (2013.01); *C08F 2222/1013* (2013.01)

(58) Field of Classification Search
CPC ............... C08F 290/067; C08F 220/68; C08F 2222/1013; C08F 222/1006; C09D 175/16; C08G 71/04; C08J 3/28
See application file for complete search history.

(56) References Cited

U.S. PATENT DOCUMENTS

| | | |
|---|---|---|
| 5,175,231 A | 12/1992 | Rappoport et al. |
| 6,218,480 B1 | 4/2001 | Rappoport |
| 6,960,619 B2 | 11/2005 | Figovsky et al. |
| 2004/0024110 A1 | 2/2004 | Hamersky et al. |
| 2005/0075471 A1 | 4/2005 | Fan et al. |
| 2005/0095933 A1 | 5/2005 | Kimbrell et al. |
| 2006/0058549 A1* | 3/2006 | Stone .................... C07C 269/06 560/158 |
| 2007/0287093 A1 | 12/2007 | Jing et al. |
| 2010/0292396 A1 | 11/2010 | Binder et al. |
| 2013/0004677 A1* | 1/2013 | Hwang .................. C08G 71/04 427/512 |
| 2016/0122473 A1* | 5/2016 | Monnier .............. C09D 175/16 523/400 |

OTHER PUBLICATIONS

Assumption et al.; "Photopolymerization of urethane dimethacrylates synthesized via a non-isocyanate route" ; Polymer, 44; 2003, pp. 5131-5136.
Bai et al.; "Synthesis of a diamine cross-linker containing Diels-Alder adducts to produce self-healing thermosetting epoxy polymer from a widely used epoxy monomer†"; Polym. Chem.; 4; 2013, pp. 724-730.
Calo et al.; "Cyclic Carbonate Formation from Carbon Dioxide and Oxiranes in Tetrabutylammonium Halides as Solvents and Catalysts"; Org. Lett., vol. 4, No. 15; 2002, pp. 2561-2563.
Clements; "Reactive Applications of Cyclic Alkylene Carbonates"; Ind. Eng. Chem. Res.; 42; 2003, pp. 663-674.
Darensbourg et al.; "Catalysts for the reactions of epoxides and carbon dioxide"; Coordination Chemistry Reviews, 153; 1996, pp. 155-174.
Figovsky et al.; "Advanced coatings based upon non-isocyanate polyurethanes for industrial applications"; Surface Coatings International Part B: Coatings Transactions, vol. 87, B2; Jun. 2004, pp. 83-90.
Hwang et al.; "A new UV-curable PU resin obtained through a nonisocyanate process and used as a hydrophilic textile treatment"; J Polym Res, 19; 2012, 10 pages.
International Search Report for International Application No. PCT/US2015/037626, International Filing Date Jun. 25, 2015, dated Sep. 30, 2015, 11 pages.
Kihara et al.; "Catalytic Activity of Various Salts in the Reaction of 2,3-Epoxypropyl Phenyl Ether and Carbon Dioxide under Atmospheric Pressure"; J . Org. Chem.; 58; 1993, pp. 6198-6202.

(Continued)

*Primary Examiner* — Satya B Sastri
(74) *Attorney, Agent, or Firm* — Alston & Bird LLP

(57) ABSTRACT

Disclosed herein a composition comprising a urethane of the FIG. 3; where hydroxyl or amine linkages on the urethane of the FIG. 3 are functionalized with molecules that contain fluorine atoms, phosphorus atoms, sulfur atoms, unsaturated carboxylic acids, derivatives of unsaturated carboxylic acids, or combinations thereof. Disclosed herein too is a composition comprising a urethane of the FIG. 3; where hydroxyl or amine linkages of the urethane of the FIG. 3 are functionalized with molecules that contain fluorine atoms, phosphorus atoms, sulfur atoms, unsaturated carboxylic acids, derivatives of unsaturated carboxylic acids, or combinations thereof; and a polymeric resin.

11 Claims, 25 Drawing Sheets

(56) References Cited

OTHER PUBLICATIONS

Kihara et al.; "Incorporation of Carbon Dioxide into Poly(glycidyl methacrylate)"; Macromolecules; 25; 1992, pp. 4824-4825.

Lee et al.; "Preparation and Acid Dye Adsorption Behavior of Polyurethane/Chitosan Composite Foams";Fibers and Polymers, vol. 10, No. 5; 2009, pp. 636-642.

Melendez et al.; "One-component catalysts for cyclic carbonate synthesis"; Chem. Commun.,No. 18; 2009, pp. 2577-2579.

Melendez et al.; "Synthesis of Cyclic Carbonates from Atmospheric Pressure Carbon Dioxide Using Exceptionally Active Aluminium(salen) Complexes as Catalysts"; Eur. J. Inorg. Chem.; 2007, pp. 3323-3326.

Ochiai et al.; "Carbon dioxide and carbon disulfide as resources for functional polymers"; Prog. Polym. Sci. 30; 2005, pp. 183-215.

Ochiai et al.; "Synthesis and Properties of Polyhydroxyurethane Bearing Silicone Backbone"; Journal of Polymer Science, Part A: Polymer Chemistry, 52; 2014, pp. 1113-1118.

Rokicki et al.; "Multicyclic Carbonates as Environmentally Benign Starting Materials for Methacrylate-Urethane Monomers of Low Oxygen Inhibition and Polymerization Shrinkage"; MACRO, Taipei, Taiwan, Jun. 29-Jul. 4, 2008; 2008, 2 pages.

Sonnati et al.; "Glycerol carbonate as a versatile building block for tomorrow: synthesis, reactivity, properties and applications"; Green Chem., 15; 2013, pp. 283-306.

Sun et al.; "Development in the green synthesis of cyclic carbonate from carbon dioxide using ionic liquids"; Journal Organometallic Chemistry, 690; 2005, pp. 3490-3497.

Tamami et al.; "Incorporation of Carbon Dioxide into Soybean Oil and Subsequent Preparation and Studies of Nonisocyanate Polyurethane Networks"; Journal of Applied Polymer Science, vol. 92; 2004, pp. 883-891.

Van Holen et al.; "New Routes to Urethane Acrylates"; RadTech Europe 2005 Conference & Exhibition; 2005, 6 pages.

Van Holen; "Non-NCO urethane acrylates", European Coatings Journal, 22; 2006, 11 pages.

Wang et al.; "Investigation of non-isocyanate urethane dimethacrylate reactive diluents for UV-curable polyurethane coatings"; Progress in Organic Coatings; 76; 2013, pp. 1057-1067.

Written Opinion for International Application No. PCT/US2015/037626, International Filing Date Jun. 25, 2015, dated Sep. 30, 2015, 5 pages.

\* cited by examiner (28)

(47)

(48)

US 10,221,274 B2

POLYURETHANES, ARTICLES COMPRISING THE SAME AND METHODS OF MANUFACTURE THEREOF

CROSS-REFERENCE TO RELATED APPLICATIONS

This application is a National Stage application of PCT/US2015/037626, filed Jun. 25, 2015, which claims the benefit of U.S. Provisional Application No. 62/016,877, filed Jun. 25, 2014, both of which are incorporated by reference in their entirety herein.

STATEMENT REGARDING FEDERALLY SPONSORED RESEARCH & DEVELOPMENT

This invention was made with government support under Contract Number N000141310443 awarded by the Office of Naval Research. The government has certain rights in the invention.

BACKGROUND

This disclosure relates to polyurethanes, articles comprising the same and to methods of manufacture thereof. In particular, this disclosure relates to a fluorinated non-isocyanate urethane dimethacrylate resin.

Polyurethane is a polymer composed of a chain of organic units joined by carbamate (urethane) links. While most polyurethanes are thermosetting polymers that do not melt when heated, thermoplastic polyurethanes are also available. Polyurethane polymers are traditionally and most commonly formed by reacting a di- or polyisocyanate with a polyol. Both the isocyanates and polyols used to make polyurethanes contain on average two or more functional groups per molecule. Some noteworthy recent efforts have been dedicated to minimizing the use of isocyanates to synthesize polyurethanes, because the isocyanates raise severe toxicity issues. Non-isocyanate based polyurethanes (NIPUs) have recently been developed as a new class of polyurethane polymers to mitigate health and environmental concerns.

To overcome these problems, it is desirable to manufacture polyurethanes via a route that does not involve the use of isocyanates. In addition, it is desirable to functionalize these polyurethanes with functional groups that contain other atoms (e.g., fluorine, silicon, phosphorus, and the like) so as to provide the polyurethane with a range of properties that render the resulting material capable of being used in a variety of applications.

SUMMARY

Disclosed herein a composition comprising a urethane of the FIG. 3; where hydroxyl or amine linkages on the urethane of the FIG. 3 are functionalized with molecules that contain fluorine atoms, phosphorus atoms, sulfur atoms, unsaturated carboxylic acids, derivatives of unsaturated carboxylic acids, or combinations thereof.

Disclosed herein too is a composition comprising a urethane of the FIG. 3; where hydroxyl or amine linkages of the urethane of the FIG. 3 are functionalized with molecules that contain fluorine atoms, phosphorus atoms, sulfur atoms, unsaturated carboxylic acids, derivatives of unsaturated carboxylic acids, or combinations thereof; and a polymeric resin.

Disclosed herein too is an article comprising a urethane of the FIG. 3; where hydroxyl or amine linkages on the urethane of the FIG. 3 are functionalized with molecules that contain fluorine atoms, phosphorus atoms, sulfur atoms, unsaturated carboxylic acids, derivatives of unsaturated carboxylic acids, or combinations thereof; and a substrate upon which the fluorinated urethane methacrylate is disposed.

Disclosed herein too is a method comprising reacting a cyclic carbonate with a diamine to form a urethane; reacting the urethane with a methacrylate to form a non-isocyanate urethane methacrylate; and functionalizing the non-isocyanate urethane methacrylate with a molecule that contains fluorine atoms, phosphorus atoms, sulfur atoms, unsaturated carboxylic acids, derivatives of unsaturated carboxylic acids, or combinations thereof.

Disclosed herein too is an article comprising a urethane of the FIG. 3; where hydroxyl or amine linkages on the urethane of the FIG. 3 are functionalized with molecules that contain fluorine atoms, phosphorus atoms, sulfur atoms, unsaturated carboxylic acids, derivatives of unsaturated carboxylic acids, or combinations thereof.

DETAILED DESCRIPTION

Disclosed herein is a non-isocyanate route to synthesizing fluorinated polyurethane methacrylates (hereinafter fluorinated polyurethane methacrylate). In an exemplary embodiment, the fluorinated polyurethane methacrylate can be functionalized with molecules that contain phosphorus atoms, silicon atoms, other reactive functionalities or even non-reactive functionalities (e.g., endcapping groups) that render important properties to the resulting molecule. These properties can involve flame retardancy, moisture uptake, abrasion resistance and the like.

In conventional polyurethane (PU) preparation processes, the polyurethane is synthesized by using isocyanates (such as diisocyanates and polyisocyanates) and polyols (such as diols or polyhydroxy polyols with high functionality) as major raw materials, but the manufacturing process of this sort usually requires phosgene which is a severely toxic pollutant. If the phosgene is leaked accidentally during the manufacturing process, the phosgene will pose an immediate threat to our environment and jeopardize our health such as causing pulmonary edema, and the manufacturing process itself will lead to a certain degree of risk. Therefore, scientists attempt to use non-isocyanates routes (which use absolutely no isocyanates at all) to manufacture polyurethane.

Figure 1:
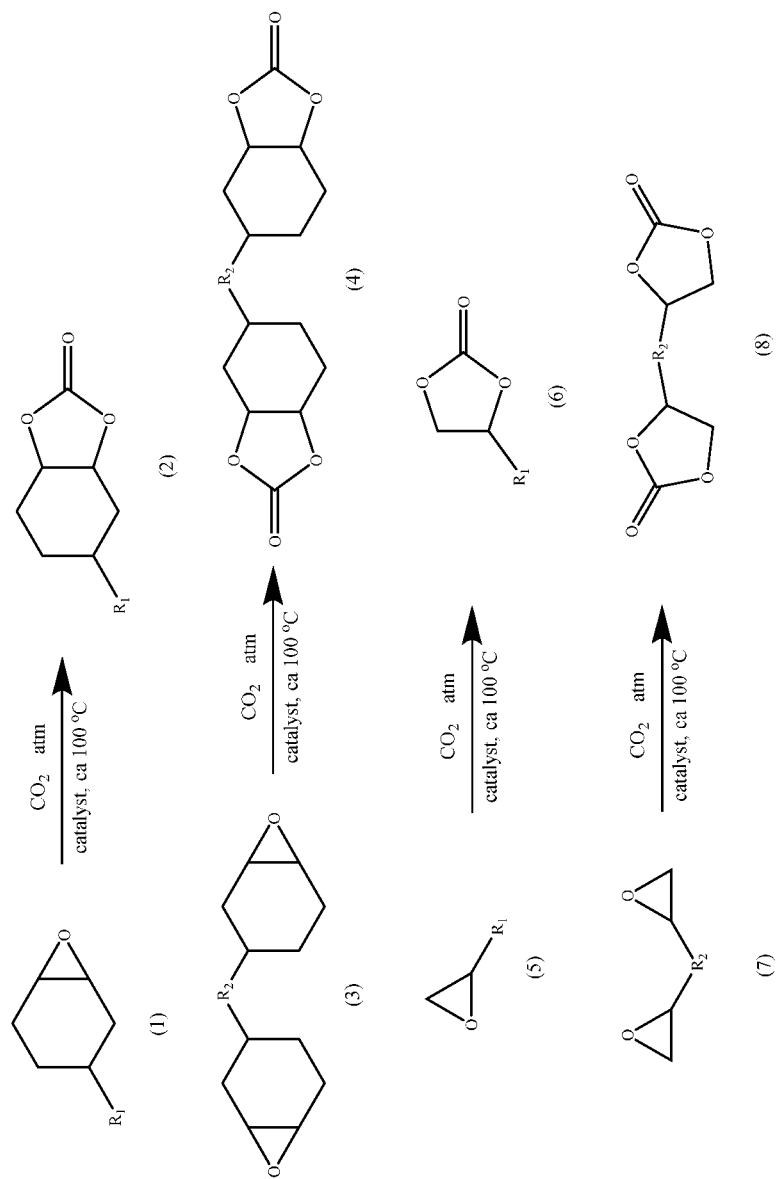
FIG. 1 depicts the reaction between carbon dioxide and an oxirane ring to form cyclic carbonates.
Figure 2:
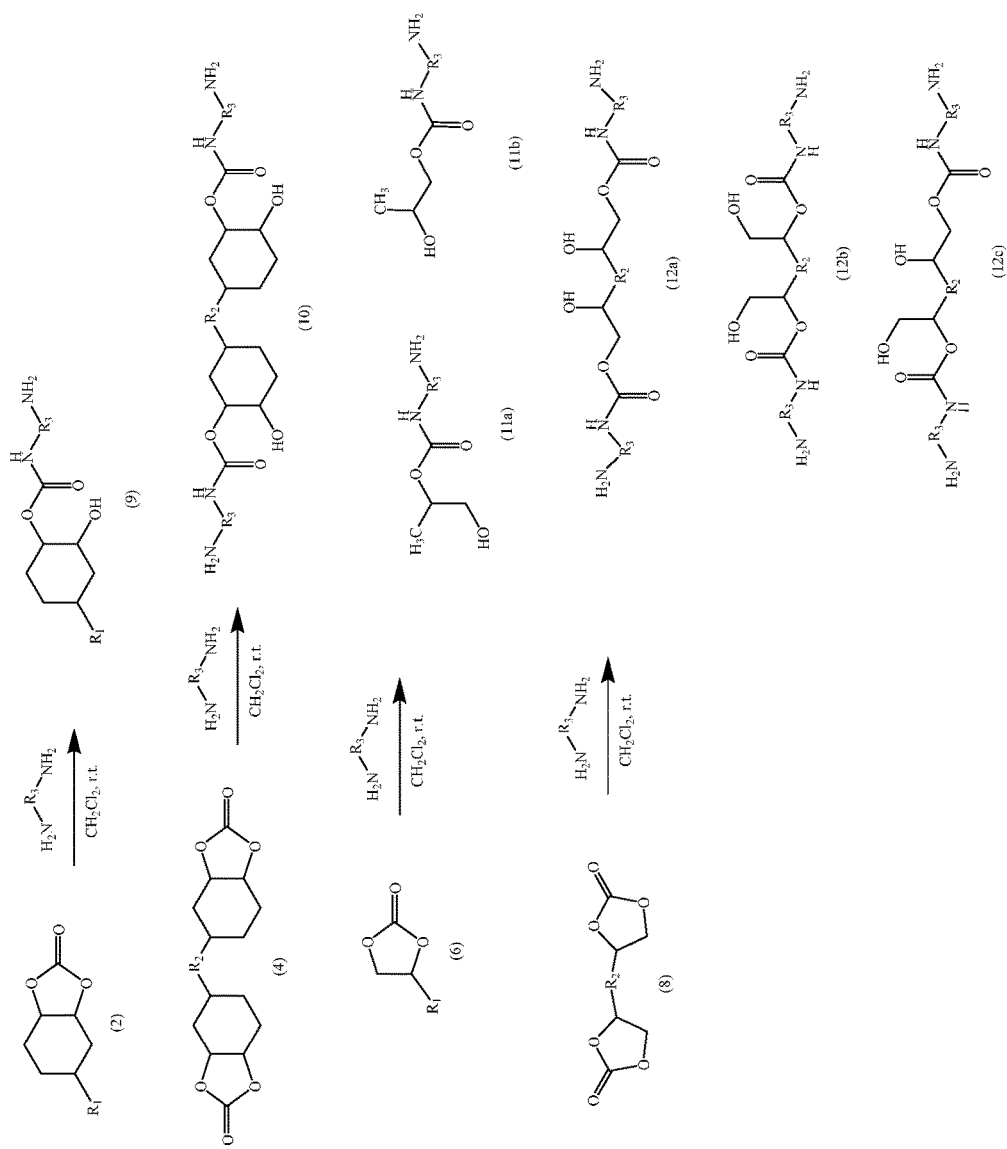
FIG. 2 shows the reaction of a cyclic carbonate with a diamine to form a urethane.

Polyurethanes can be manufactured by a method that involves not using any diisocyanates, wherein five-membered cyclic carbonates (Bis(cyclic carbonate)s) and primary amines are reacted at room temperature to produce a high yield of β-position hydroxyl polyurethane (2-hydroxyethylurethane), and the reaction is represented by the chemical equations shown in the FIGS. 1 and 2.

FIG. 1 shows the reaction between carbon dioxide and an oxirane ring to produce cyclic carbonates. FIG. 1 depicts the reaction between carbon dioxide and the oxirane ring for both single cyclic carbonates and bicyclic carbonates. As shown in the FIG. 1, the cyclic carbonates are manufactured by a nucleophilic ring opening reaction of oxirane and carbon dioxide. The cyclic carbonate is manufactured by the reaction of oxirane with carbon dioxide in the presence of a catalyst. The catalyst can include an amine, a phosphine, a quaternary ammonium salt, an antimony compound, a porphyrin, and/or a transition metal complex. The reaction to produce the cyclic carbonate can be produced at a variety of different pressures ranging from atmospheric pressure to high pressures of 10 to 50 atmospheres. FIG. 2 shows the reaction between the cyclic carbonates and diamines to produce the non-isocyanate urethanes. A variety of reactions that result in the production of non-isocyanate urethanes are shown in the FIG. 2. As can be seen, the reaction takes place at room temperature in the presence of a solvent such as dichloromethane. The reaction can also take place at elevated temperatures if desired.

Examples of diamines that may be used in the reaction of FIG. 2 are linear aliphatic diamines (e.g., ethylenediamine (1,2-diaminoethane), derivatives of ethylene diamines such as N-alkylated compounds (ethambutol) and tetramethylethylenediamine, propane-1,3-diamine, butane-1,4-diamine, pentane-1,5-diamine, hexamethylenediamine (hexane-1,6-diamine), or combinations thereof), branched aliphatic diamines (e.g., 1,2-diaminopropane, diphenylethylenediamine, which is C2-symmetric, diaminocyclohexane, which is C2-symmetric, or combinations thereof), xylylenediamines (e.g., o-xylylenediamine, m-xylylenediamine, p-xylylenediamine, or combinations thereof), aromatic diamines (e.g., phenylenediamines such as o-phenylenediamine or OPD, m-phenylenediamine or MPD, p-phenylenediamine or PPD, 2,5-diaminotoluene is related to PPD but contains a methyl group on the ring, various N-methylated derivatives of the phenylenediamines such as dimethyl-4-phenylenediamine, N,N'-di-2-butyl-1,4-phenylenediamine, 4,4'-diaminobiphenyl, 1,8-diaminonaphthalene, or combinations thereof), cyclic diamines, polyamines or the like, or combinations thereof.

The reactions shown in the FIGS. 1 and 2 may be conducted in a variety of different solvents such as liquid carbon dioxide, supercritical carbon dioxide, dimethylformamide, dimethylacetamide, dimethylsulfoxide, and the like. The polyurethanes thus produced may be end functionalized with a variety of different molecules. The $R_1$ and $R_2$ moieties on the non-isocyanate urethane molecule are discussed in detail below.

Figure 3:
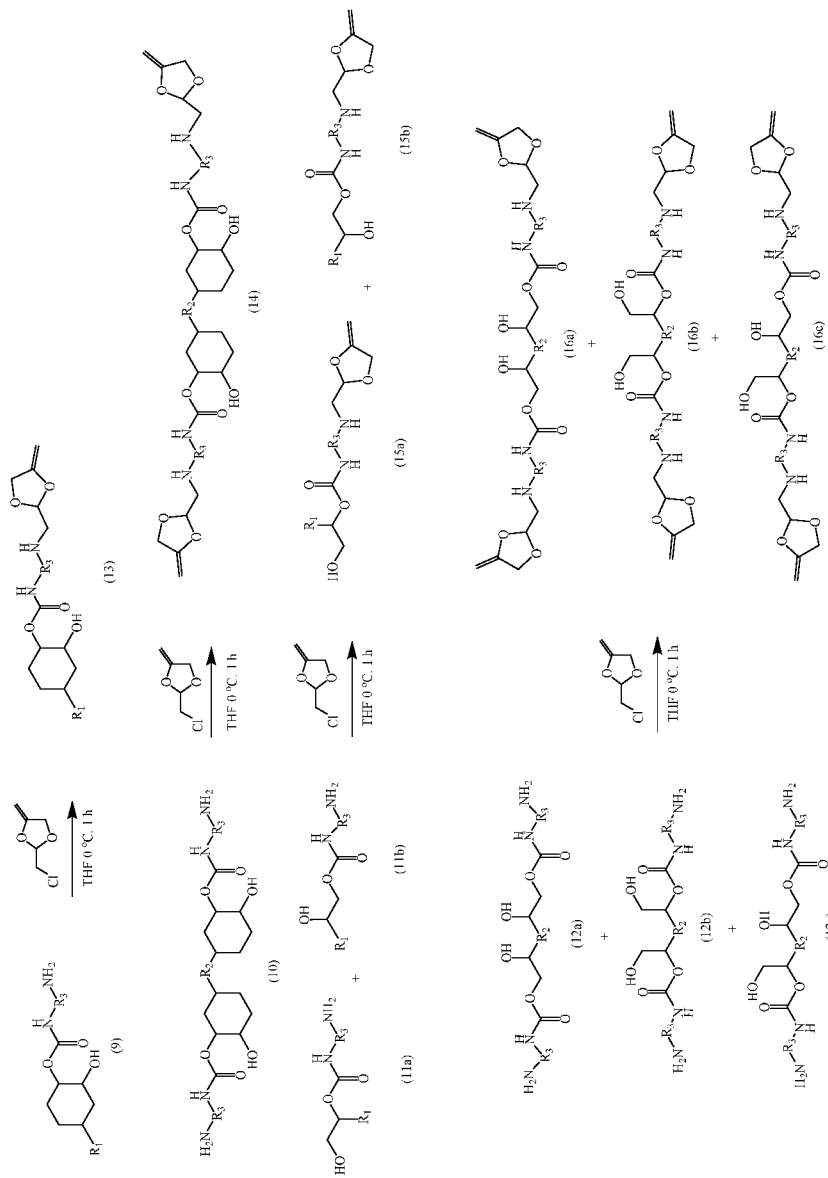
FIG. 3 shows the endcapping of the various non-isocyanate urethanes (from the FIG. 2) with 4-methylene-1,3-dioxolane.
Figure 4:
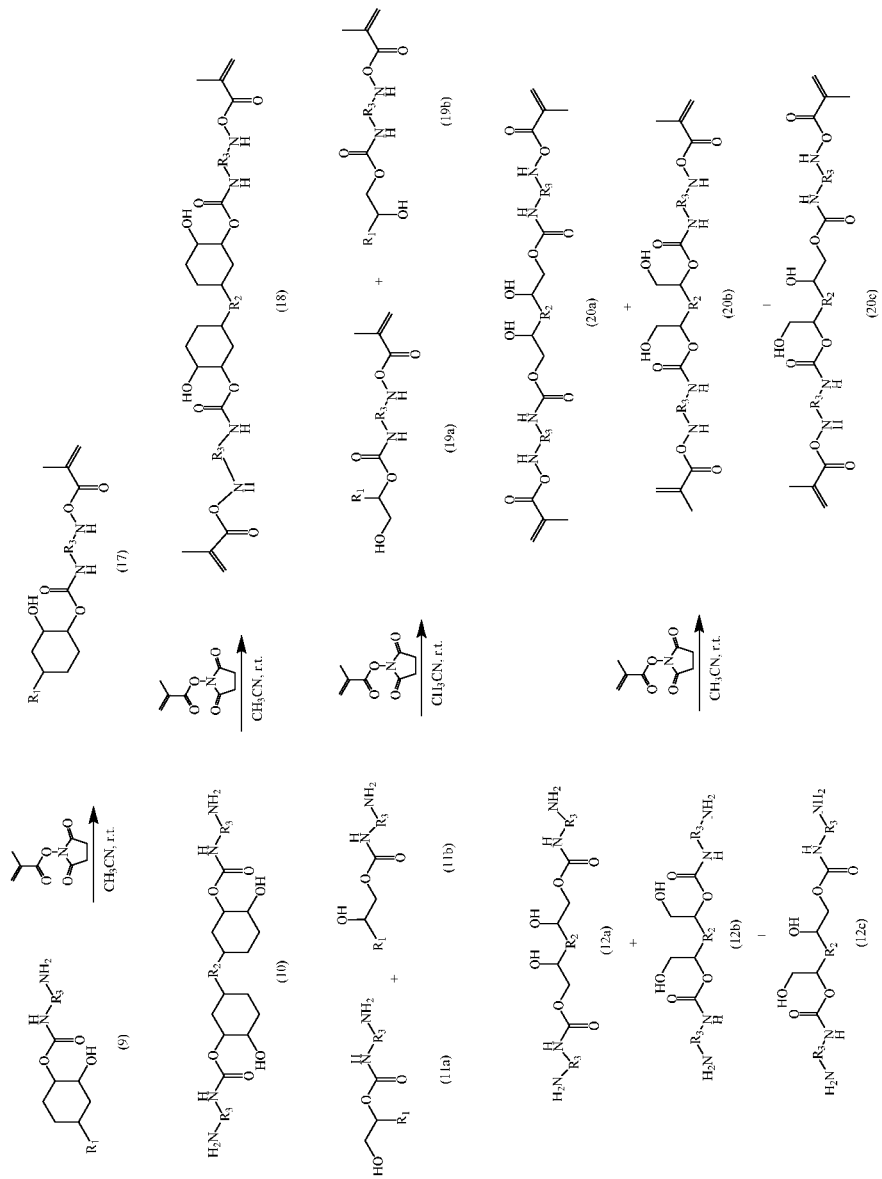
FIG. 4 shows the functionalization of the various non-isocyanate urethane methacrylates with 4-methylene-1,3-dioxolane.

FIGS. 3-7 show a variety of different reactions that can be conducted with the non-isocyanate urethanes that impart different properties and capabilities to the molecule. The FIGS. 3 and 4 show the endcapping of the various non-isocyanate urethanes (from the FIG. 2) with 4-methylene-1,3-dioxolane.

The reaction between the 4-methylene-1,3-dioxolane and the non-isocyanate urethane can be conducted in a variety of different solvents. Liquid aprotic polar solvents such as water, propylene carbonate, ethylene carbonate, butyrolactone, acetonitrile, benzonitrile, nitromethane, nitrobenzene, sulfolane, dimethylformamide, N-methylpyrrolidone, or the like, or combinations comprising at least one of the foregoing solvents are generally desirable. Polar protic solvents such as, but not limited to, methanol, acetonitrile, nitromethane, ethanol, propanol, isopropanol, butanol, or the like, or combinations comprising at least one of the foregoing polar protic solvents may be used. Other non-polar solvents such a liquid carbon dioxide, supercritical carbon dioxide, benzene, toluene, methylene chloride, carbon tetrachloride, hexane, diethyl ether, tetrahydrofuran, or the like, or combinations comprising at least one of the foregoing solvents may also be used. Co-solvents comprising at least one aprotic polar solvent and at least one non-polar solvent may also be utilized. Ionic liquids, which mainly comprise the imidazolium salts, may also be utilized for swelling the polymer. An exemplary solvent for conducting the 4-methylene-1,3-dioxolane endcapping reaction is tetrahydrofuran (THF).

These endcapping reactions (seen in the FIGS. 3 and 4) can be conducted at temperatures of −30° C. to 100° C., and preferably −10° C. to 35° C. Reaction pressure may be varied from below atmospheric pressure (i.e., a vacuum) to pressures as high as 100 psi.

As can be seen in the FIG. 3, the 4-methylene-1,3-dioxolane reacts with the amine functionality at the end of the non-isocyanate urethane molecule to endcap the molecule. In the FIG. 4, the 4-methylene-1,3-dioxolane molecule is reacted with the hydroxyl functionality on the cyclohexyl ring. In the FIG. 4, it may also be seen that the non-isocyanate urethane is methacrylate endcapped prior to being reacted with the 4-methylene-1,3-dioxolane molecule.

The urethanes of the FIG. 3 and FIG. 4 are shown below in the formulas (I) through (XIV)

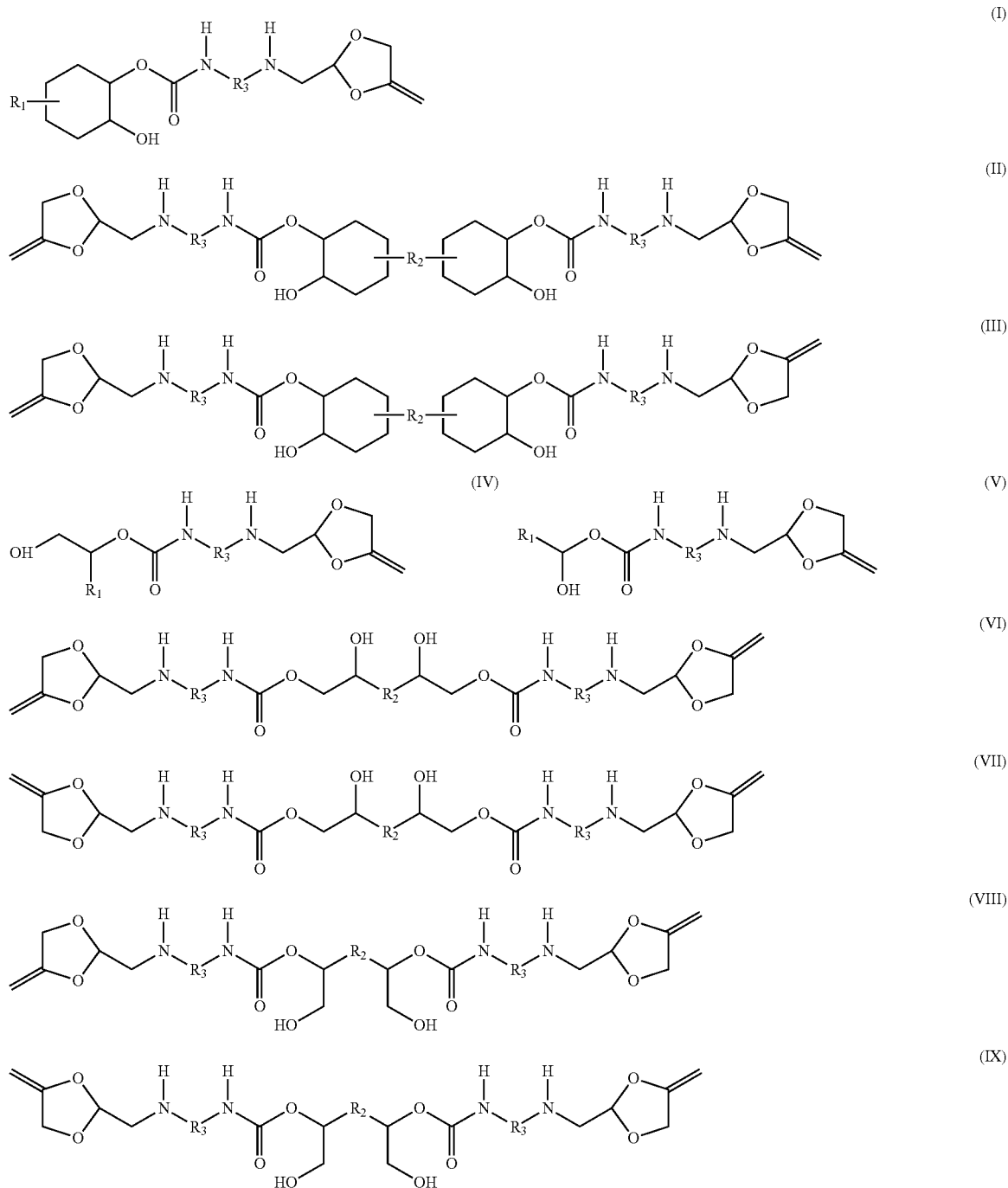

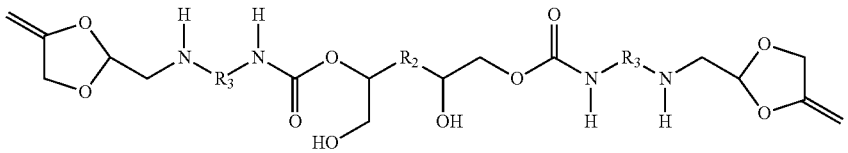

(X)

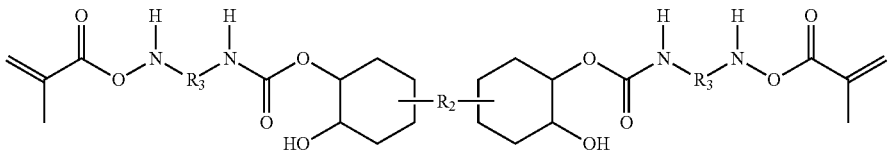

(XI)

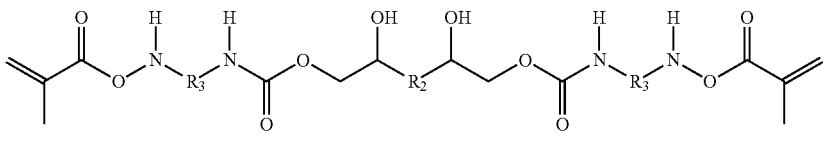

(XII)

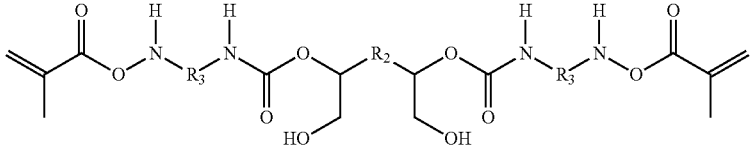

(XIII)

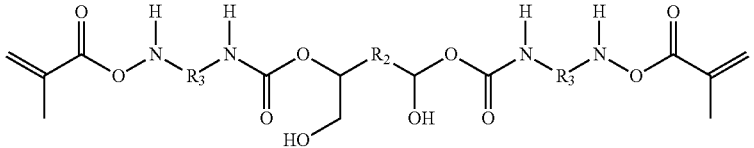

(XIV)

where hydroxyl or amine linkages on the urethane of formulas (I) through (XIV) are functionalized with molecules that contain fluorine atoms, phosphorus atoms, sulfur atoms, unsaturated carboxylic acids, derivatives of unsaturated carboxylic acids, or combinations thereof.

In the formulas (I) through (XIV), the bridging moieties $R_1$, $R_2$ and $R_3$ can be a straight chain or branched $C_{1-30}$ alkyl, a $C_{3-30}$ cycloalkyl, a $C_{6-30}$ aryl, $C_{7-30}$ alkaryl, a $C_{7-30}$ aralkyl, a $C_{1-30}$ heteroalkyl, a $C_{3-30}$ heterocycloalkyl, a $C_{6-30}$ heteroaryl, a $C_{7-30}$ heteroalkaryl, a $C_{7-30}$ heteroaralkyl or a combination comprising at least one of these groups. Other definitions for the bridging moieties $R_1$, $R_2$ and $R_3$ are detailed later below.

In a preferred embodiment, the bridging moieties $R_1$, $R_2$ and $R_3$ can be a straight chain or branched $C_{2-10}$ alkyl, a $C_{3-10}$ cycloalkyl, a $C_{6-18}$ aryl, a $C_{7-20}$ alkaryl, a $C_{7-20}$ aralkyl, a $C_{2-10}$ heteroalkyl, a $C_{3-10}$ heterocycloalkyl, a $C_{6-18}$ heteroaryl, a $C_{7-18}$ heteroalkaryl, a $C_{7-18}$ heteroaralkyl or a combination comprising at least one of these groups.

The functionalization of the non-isocyanate urethane with the 4-methylene-1,3-dioxolane provides the non-isocyanate urethane molecule with ring opening capabilities that can be further used to crosslink the molecule. 4-methylene-1,3-dioxolane endcapped polyurethanes can thus be used as dental resins. When used as a dental resin, ring opening polymerization conducted during the crosslinking process results in lower shrinkage when compared with other polyurethanes that are not 4-methylene-1,3-dioxolane end functionalized. In addition, by using the appropriate substituents for the functional group $R_1$, $R_2$ and $R_3$ (in the FIG. 3), dendritic molecules can be produced.

Figure 5:
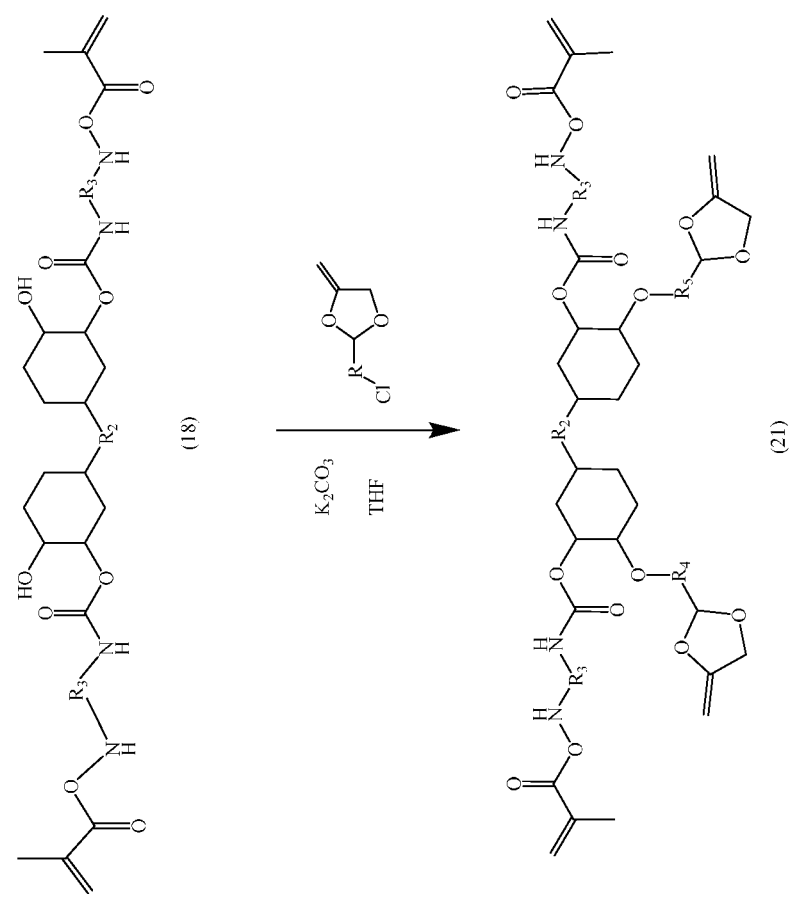
FIG. 5 shows the functionalization of the various non-isocyanate urethanes from the FIG. 2 with a methacrylate.
Figure 6A:
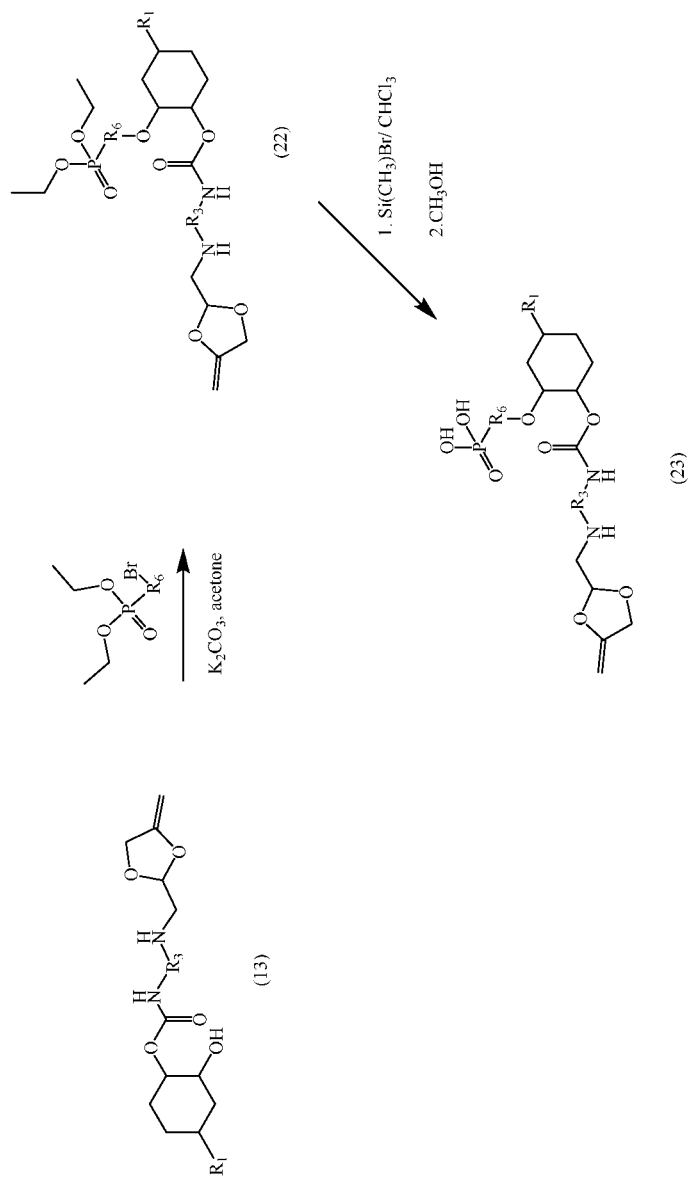
FIG. 6(A) shows the functionalization of a non-isocyanate urethane dioxolane from the FIG. 3 with phosphoric acid.
Figure 6B:
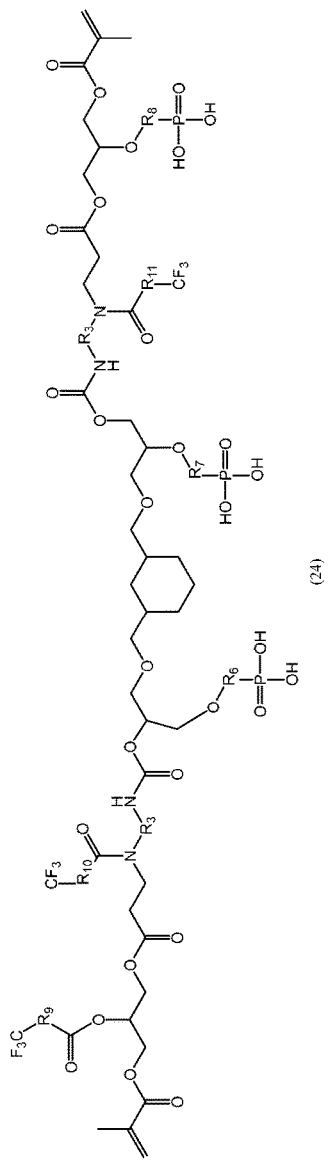
FIG. 6(B) shows the functionalization of the fluorinated non-isocyanate urethane dioxolane from the FIG. 3 with phosphoric acid.
Figure 6C:
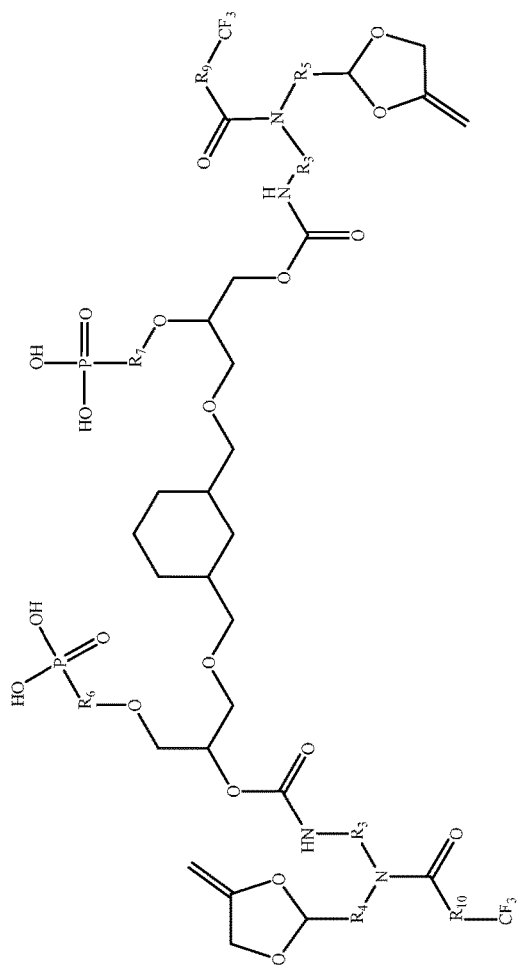
FIG. 6(C) shows the functionalization of the fluorinated non-isocyanate urethane dioxolane from the FIG. 3 with phosphoric acid.
Figure 7A:
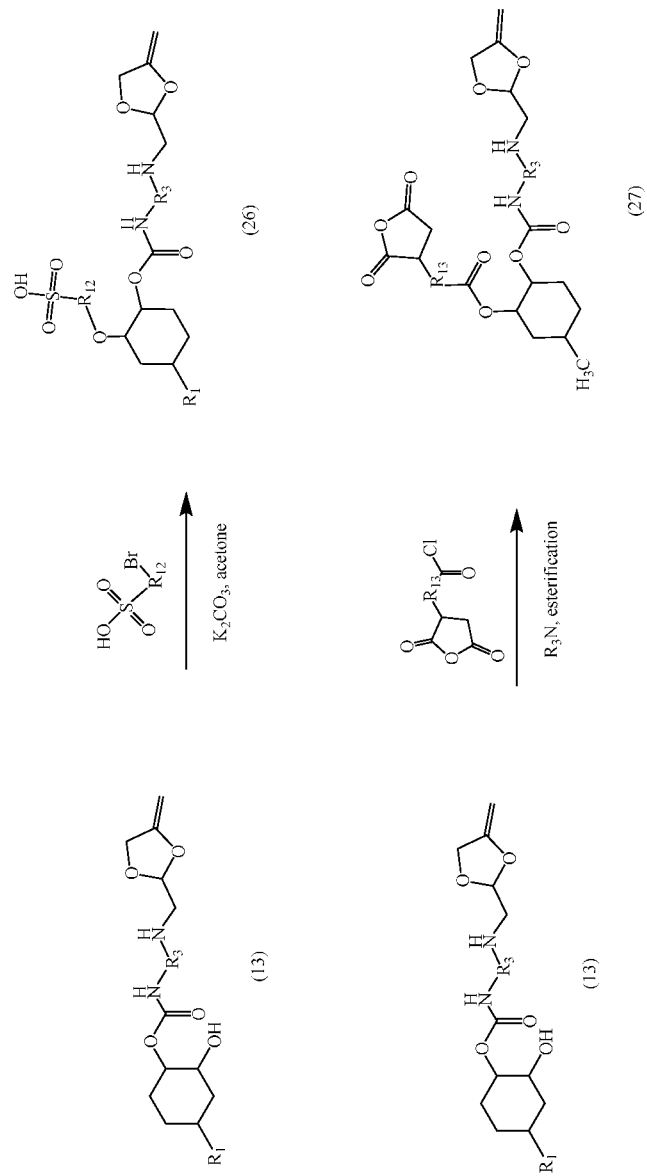
FIG. 7(A) shows the functionalization of a non-isocyanate urethane dioxolane from the FIG. 3 with sulfonic acid or an anhydride.
Figure 7B:
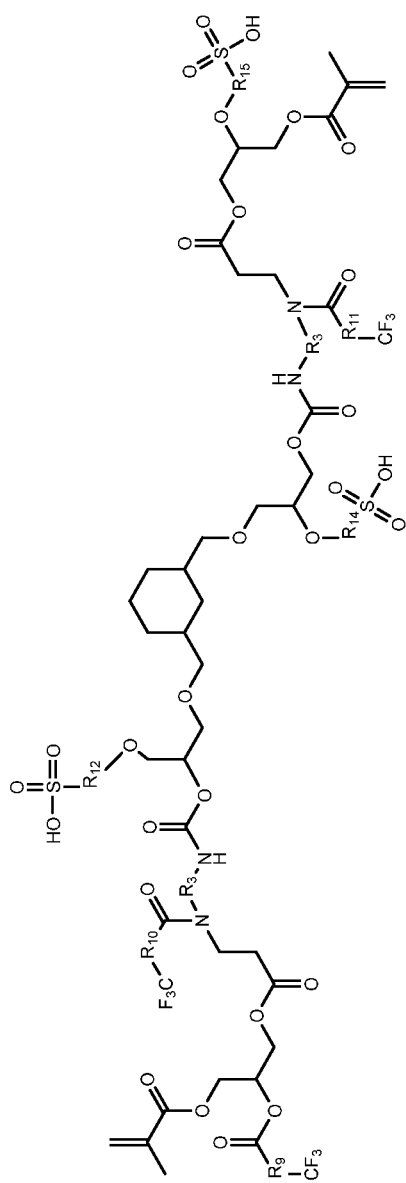
FIG. 7(B) shows the functionalization of a fluorinated non-isocyanate urethane dioxolane with sulfonic acid.
Figure 7C:
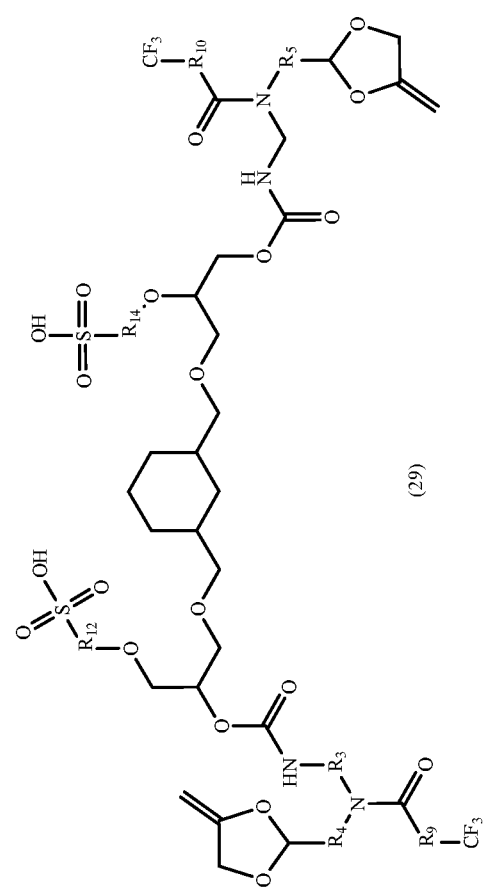
FIG. 7(C) shows the functionalization of a fluorinated non-isocyanate urethane dioxolane with sulfonic acid.
Figure 7D:
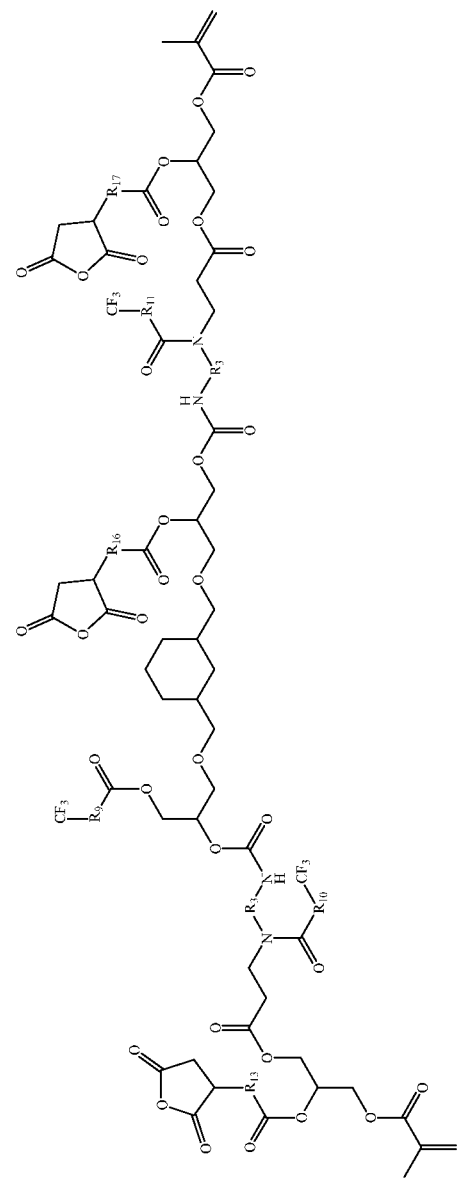
FIG. 7(D) shows the functionalization of a fluorinated no-isocyanate urethane dioxolane with any anhydride.
Figure 7E:
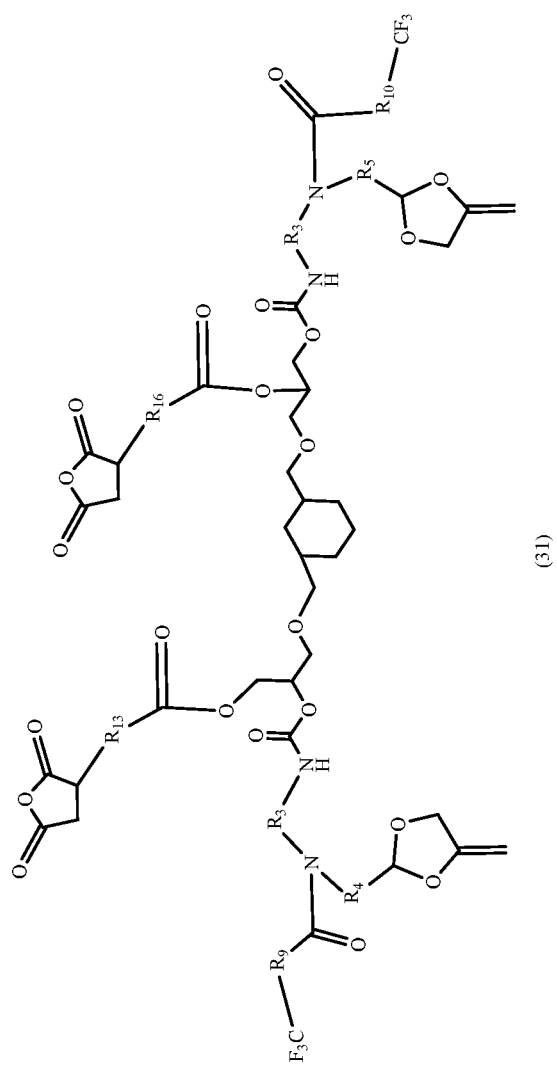
FIG. 7(E) shows the functionalization of a fluorinated non-isocyanate urethane dioxolane with any anhydride.

The FIGS. 5-7 shows the functionalization of the non-isocyanate urethane with methacrylates, phosphoric acid, sulfonic acid or an anhydride. As noted above, the functionalization can be conducted at the amine functionalized end of the non-isocyanate urethane molecule or at the hydroxyl moiety on the cyclohexyl molecule. While the FIGS. 5-7 show that the hydroxyl moiety is at the para-position with regard to the bridging moiety $R_1$, it is envisioned that the hydroxyl moiety can be located at the ortho or meta positions and can be reacted with other functional molecules such as, for example, those shown in the FIGS. 5-7. It is to be noted that the FIG. 5 depicts the end functionalization of the non-isocyanate urethane with a methacrylate functionality prior to functionalization with the 4-methylene-1,3-dioxolane molecule. FIG. 6(A) shows the functionalization of a fluorinated non-isocyanate urethane dioxolane from the FIG. 3 with phosphoric acid; FIGS. 7(A) and 7 (B) show the functionalization of a fluorinated non-isocyanate urethane dioxolane with sulfonic acid; and the FIGS. 7(C) and 7(D) show the functionalization of a fluorinated non-isocyanate urethane dioxolane with any anhydride.

In one embodiment, the non-isocyanate urethane can be functionalized with unsaturated carboxylic acids are maleic acid, fumaric acid, itaconic add, acrylic acid, methacrylic acid, crotonic acid, and citraconic acid. Examples of derivatives of unsaturated carboxylic acids are maleic anhydride, citraconic anhydride, itaconic anhydride, methyl acrylate, methyl methacrylate, ethyl acrylate, ethyl methacrylate, butyl acrylate, butyl methacrylate, glycidyl acrylate, glycidyl methacrylate, methyl acrylate anhydride or the like, or a combination thereof. Maleic anhydride is the preferred grafting compound for functionalizing the non-isocyanate urethanes.

In one exemplary embodiment, the non-isocyanate urethane can be functionalized with molecules that have fluorine atoms to provide the polyurethanes with unique functional properties. These polyurethanes are called fluorinated non-isocyanate urethane dimethacrylate resins and can be used in a variety of different applications. The manufacturing of these fluorinated non-isocyanate urethane dimethacrylate resins is detailed in the FIGS. 8-10.

Figure 8:
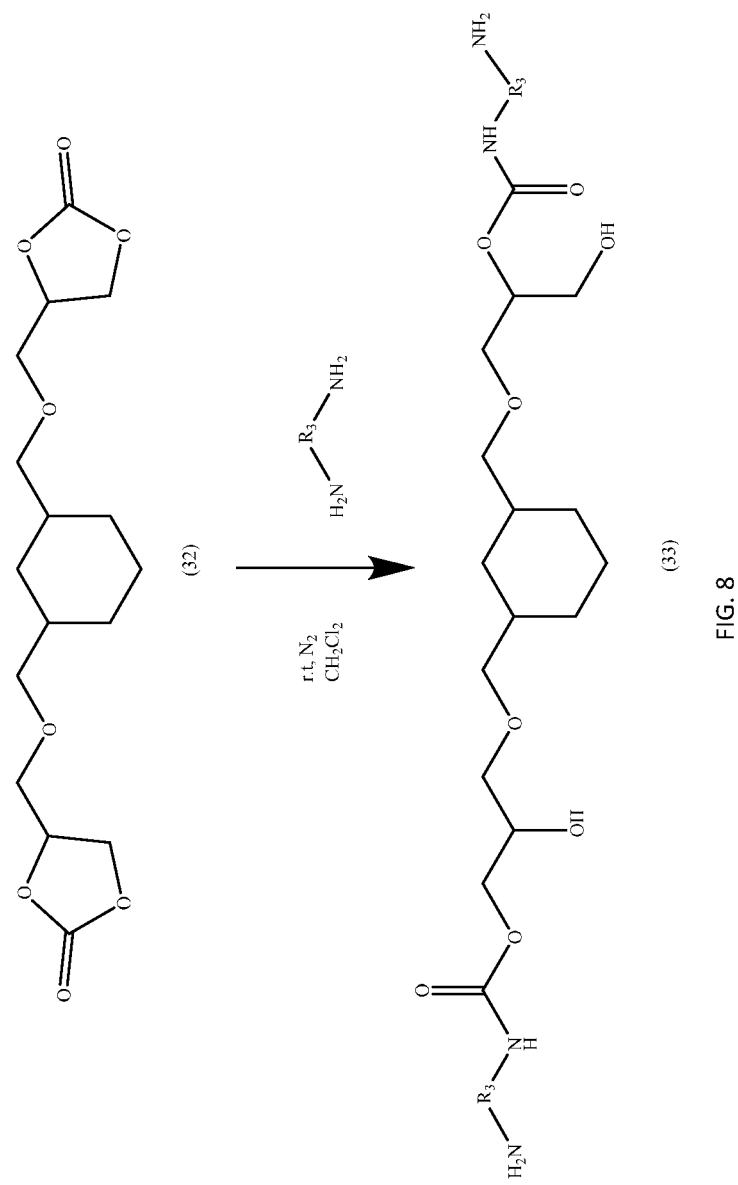
FIG. 8 shows the reaction of a cyclic carbonate with a cyclic diamine to form a urethane.

In the FIG. 8, the cyclic carbonate is reacted with a cyclic isophorondiamine to produce an asymmetric non-isocyanate urethane that is endcapped with the cyclic diamine. The FIG. 8 depicts one method of endcapping the cyclic carbonate with a cyclic diamine. The cyclic diamine is 5-amino-1,3,3-trimethylcyclohexanemethylamine (IPDA).

The reaction is conducted in the presence of a dichloromethane solvent and the reactants are covered in a blanket of nitrogen during the reaction. About 0.5 to 2.3 moles of the diamine are used per mole of the cyclic carbonate. The reaction temperature is 0 to 70° C., preferably 20 to 30° C. and the reaction pressure is 0.1 atmosphere to 20 atmospheres, preferably 1 to 2 atmospheres. The reaction may be conducted in a batch or in a continuous reactor, preferably in a batch reactor. It is to be noted that other solvents listed above may also be used in lieu of or in conjunction with the dichloromethane.

Figure 9:
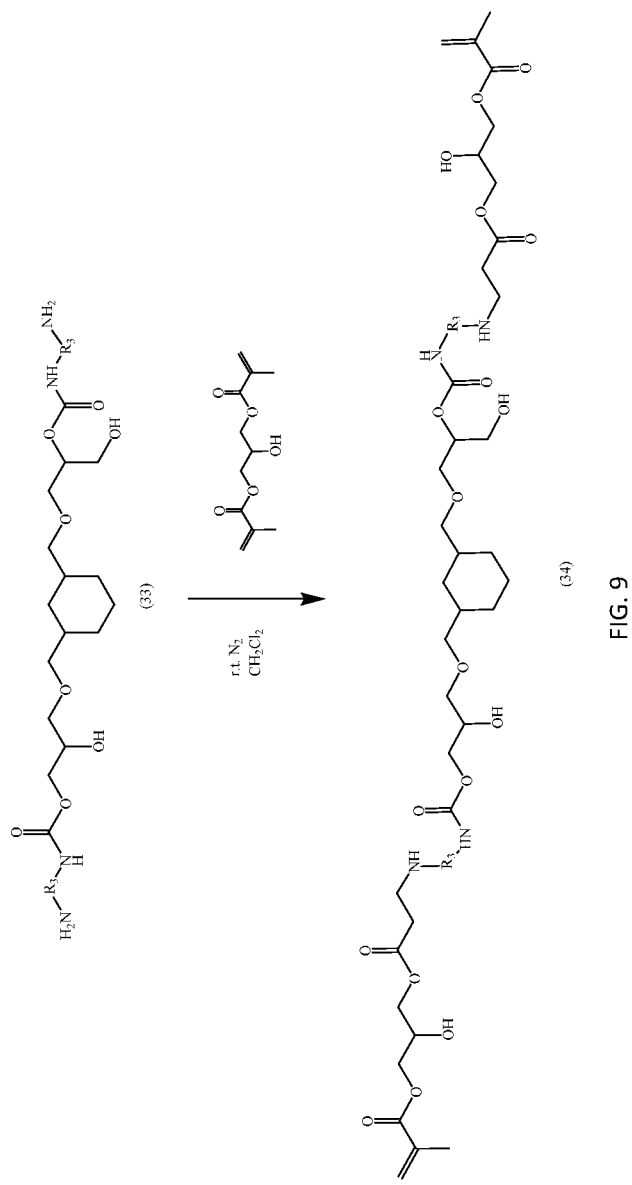
FIG. 9 shows the reaction of the urethane with a methacrylate to form a non-isocyanate urethane dimethacrylate.

The non-isocyanate urethane functionalized with the cyclic isophorondiamine of the FIG. 8 is then reacted with a methacrylate (3-acryloyloxy-2-hydroxypropyl methacrylate (AHM)) in the presence of dichloromethane under a blanket of nitrogen as shown in the FIG. 9 to form a dimethacrylate functionalized urethane. With reference to the FIG. 9, about 1.9 to 2.3 moles of the dimethacrylate are used per mole of the non-isocyanate urethane. The reaction temperature is −10 to 70° C., preferably 20 to 30° C. and the reaction pressure is 0.1 atmosphere to 20 atmospheres, preferably 1 to 2 atmospheres. The reaction may be conducted in a batch or in a continuous reactor, preferably in a batch reactor. In an embodiment, the reaction of the FIG. 9 can be conducted in the same reactor as that of the FIG. 8. The reaction of the FIG. 8 is detailed in U.S. Patent Publication No. 20130004467 to Jing-Zhong Hwang et al., the entire contents of which are hereby incorporated by reference.

Figure 10:
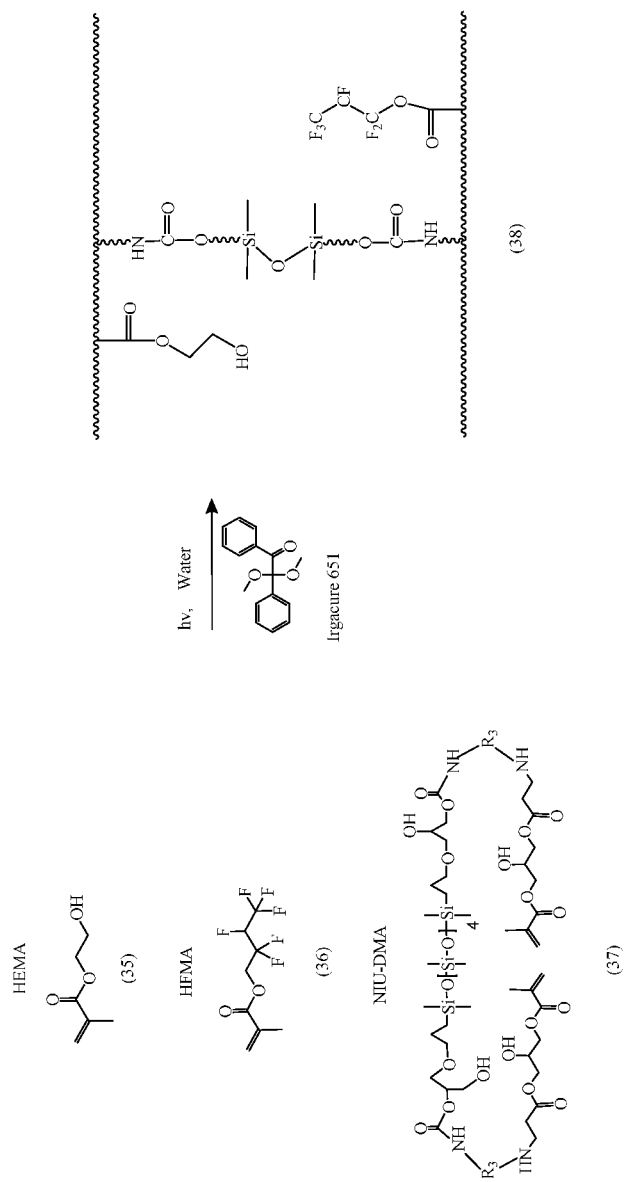
FIG. 10 shows one exemplary embodiment of how a non-isocyanate urethane dimethacrylate can be used to form a hydrogel.

The dimethacrylate functionalized urethane of the FIG. 9 can be cured using radiation or can be cured thermally to create a hydrogel. Radiation includes ultraviolet radiation, microwave radiation, xray radiation, electron beam radiation and the like. The FIG. 10 shows how the dimethacrylate functionalized urethane of the FIG. 9 (optionally containing a polydimethylsiloxane molecule) may be mixed with other methacrylates such as hydroxyethylmethacrylate (HEMA) and hexafluorobutyl methacrylate (HFMA) to form a mixture. The mixture can then be applied to a surface and then irradiated to form a hydrogel. By varying the ratio of HFMA to HEMA and the dimethacrylate functionalized urethane, the hydrophobicity of the surface can be controlled. In addition, by varying the amount of the optional polysiloxane in the dimethacrylate functionalized urethane, the hydrophobicity of the surface can also be controlled.

In a hydrogel formulation, the HEMA is present in an amount of 50 to 90 mole percent, preferably 60 to 80 mole percent, based upon the total number of moles of the composition. The HFMA is present in an amount of 5 to 30 mole percent, preferably 10 to 20 mole percent, based upon the total number of moles of the composition. The dimethacrylate functionalized urethane is present in an amount of 5 to 20, preferably 6 to 15 mole percent based upon the total number of moles of the hydrogel composition. The hydrogel composition may use a catalyst, an initiator and/or a curing agent as desired.

Figure 11:
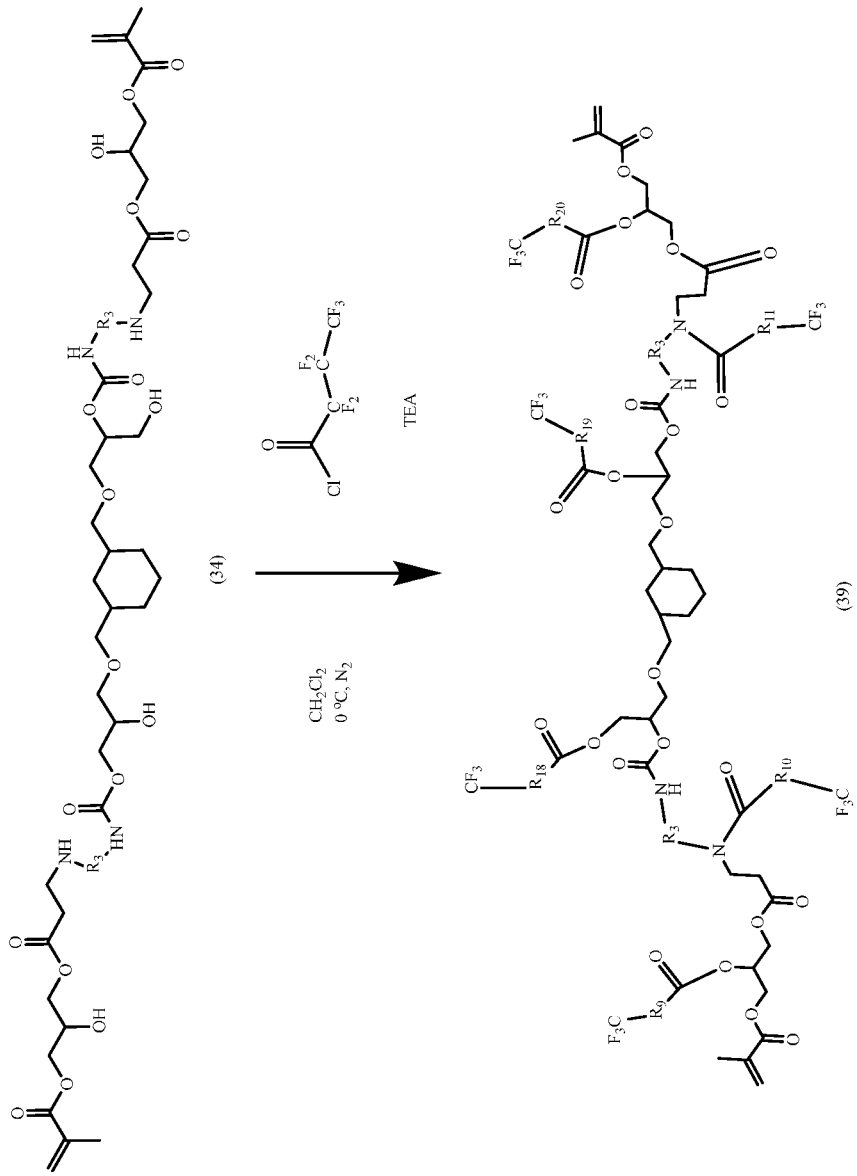
FIG. 11 shows on exemplary embodiment of the reaction of the non-isocyanate urethane dimethacrylate with a fluorine containing molecule to produce a fluorinated non-isocyanate urethane dimethacrylate.
Figure 12A:
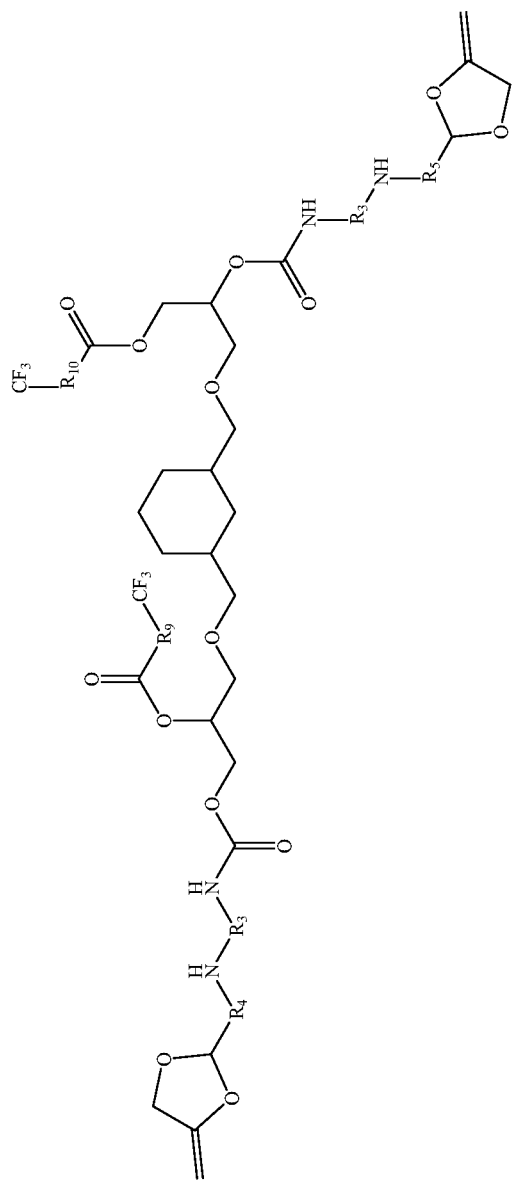
FIG. 12(A) shows an exemplary structure of a non-isocyanate urethane functionalize with fluorine containing molecules.
Figure 12B:
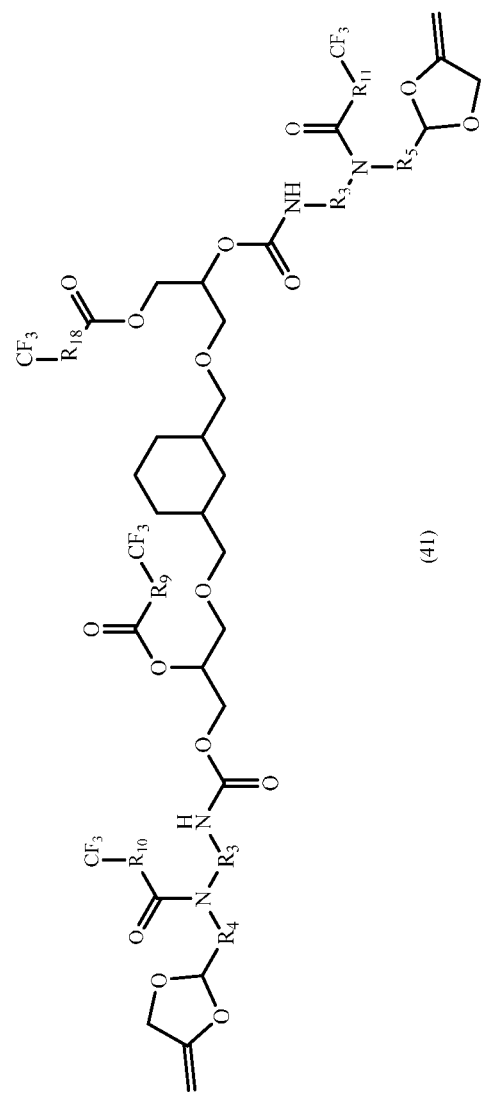
FIG. 12(B) sows an exemplary structure of a non-isocyanate urethane functionalized with fluorine containing molecules.
Figure 13:
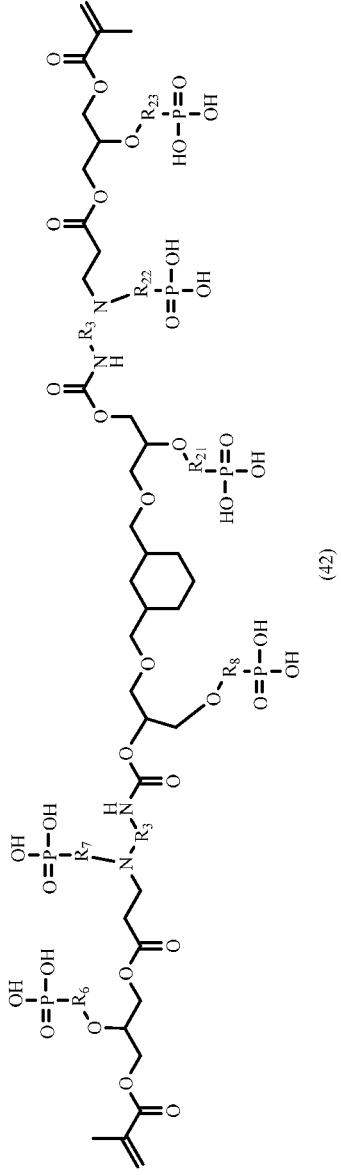
FIG. 13 shows an exemplary structure of a non-isocyanate urethane functionalized with phosphorus containing molecules.
Figure 14:
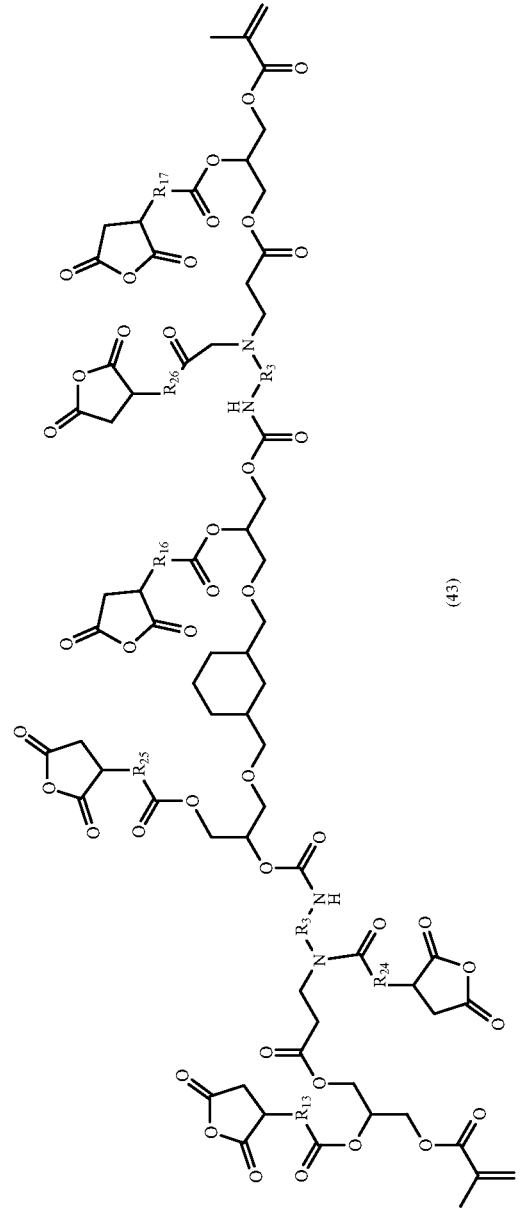
FIG. 14 shows an exemplary structure of a non-isocyanate urethane functionlized with anhydride containing molecules.
Figure 15:
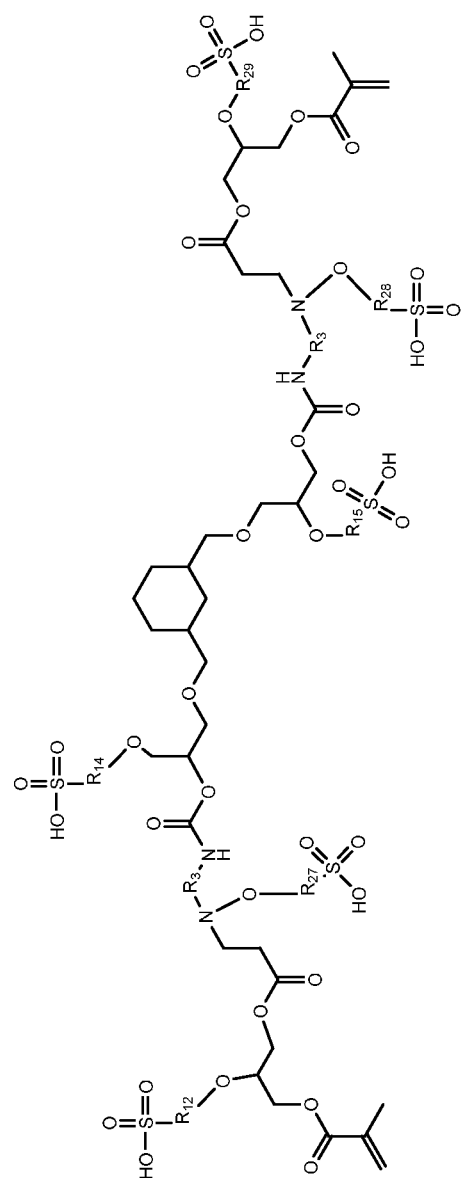
FIG. 15 shows an exemplary structure of a non-isocyanate urethane functionalized with sulfur containing molecules.
Figure 16A:
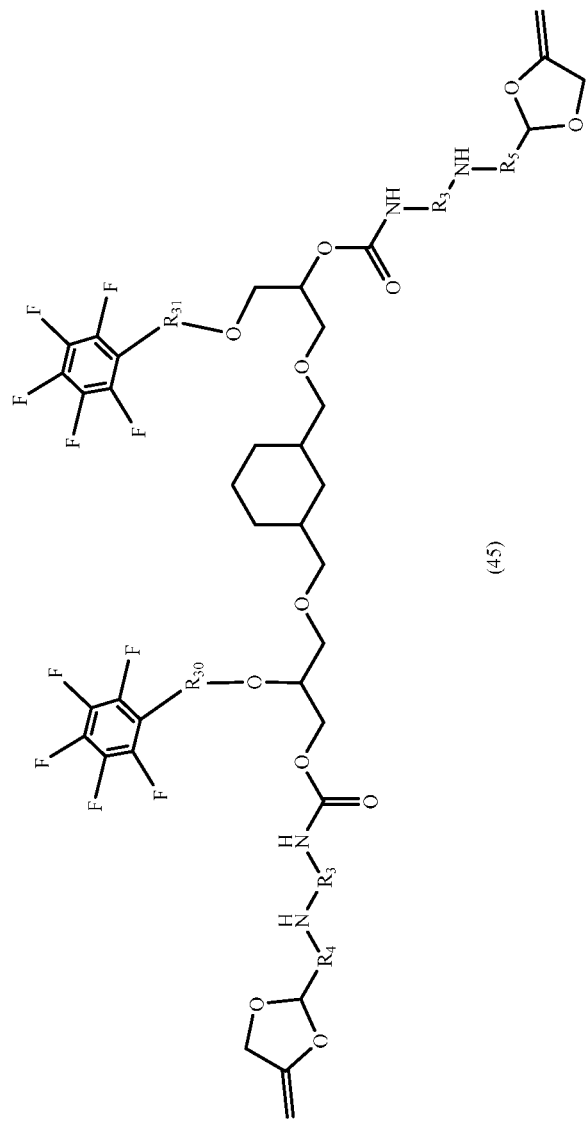
FIG. 16(A) shows an exemplary structure of a non-isocyanate urethane functionalized with fluorine containing molecules.
Figure 16B:
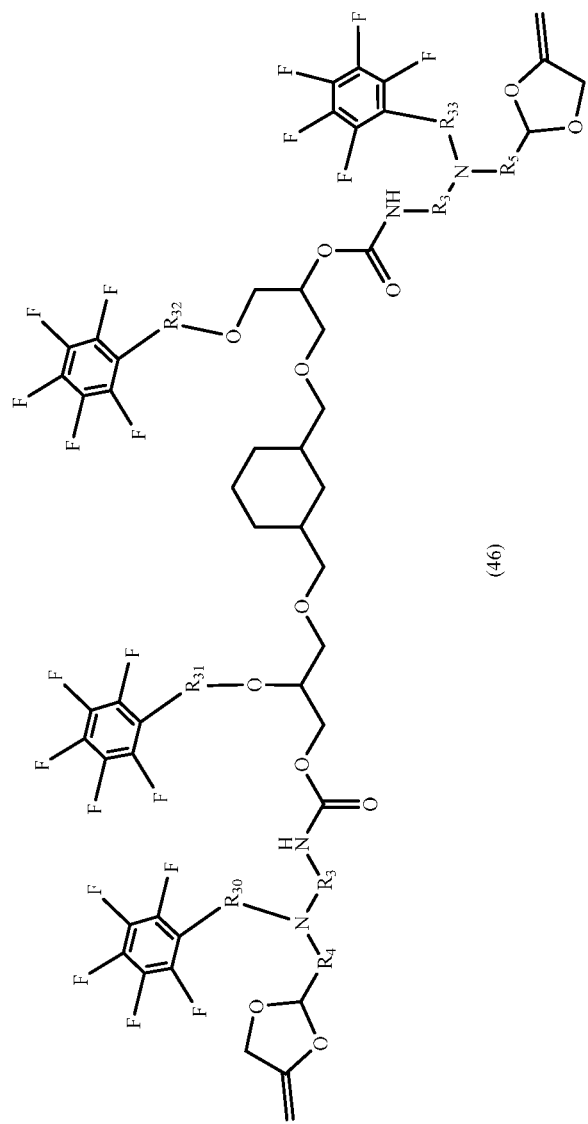
FIG 16(B) shows an exemplary structure of a non-isocyanate urethane functionalized with fluorine containing molecules.
Figure 17:
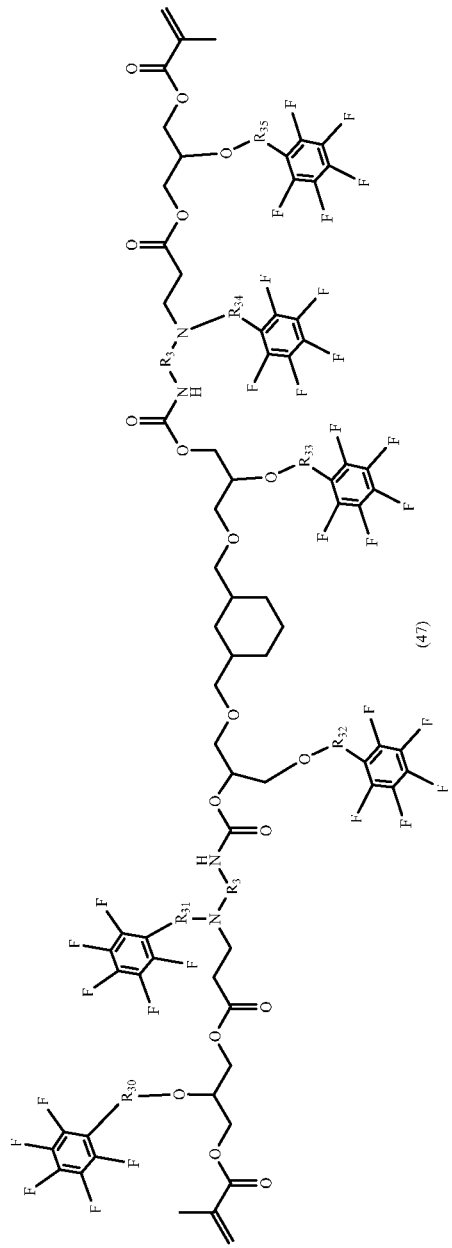
FIG. 17 shows an exemplary structure of a non-isocyanate urethane functionalized with fluorine containing molecules.
Figure 18:
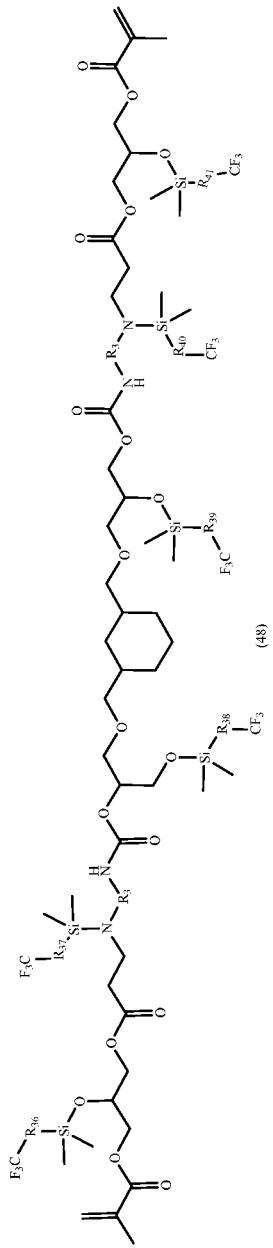
FIG. 18 shows an exemplary structure of a non-isocyanate urethane functionalized with silicon and fluorine containing molecules.

In one embodiment, the dimethacrylate functionalized urethane can be functionalized with a fluorine containing molecule to form the fluorinated non-isocyanate urethane methacrylate. The FIG. 11 depicts the functionalization of the dimethacrylate functionalized urethane to form the fluorinated non-isocyanate urethane methacrylate. The reaction of the FIG. 11 is conducted in the presence of dichloromethane under a blanket of nitrogen. With reference to the FIG. 11, about 0.1 to 7.2 moles of the fluorine containing molecule are used per mole of the dimethacrylate functionalized urethane. In one embodiment, the fluorine containing molecule is perfluorobutyryl chloride. The reaction temperature is −10 to 70° C., preferably −5 to 10° C. and the reaction pressure is 0.1 to 20 atmospheres, preferably 1 to 2 atmospheres. The reaction may be conducted in a batch or in a continuous reactor, preferably in a batch reactor. In an embodiment, the reaction of the FIG. 11 can be conducted in the same reactor as that of the FIG. 9.

With regard to the FIG. 11, it may be seen that that the fluorine containing molecule can react with the dimethacrylate functionalized urethane at either the hydroxyl moiety or at the amine moiety. In one embodiment, some of the hydroxyl moieties (on the dimethacrylate functionalized urethane) can be reacted with the fluorine containing molecules with other can be reacted with molecules that contain phosphorus, silicon, sulfur, boron, and the like. Some of these alternative functionalization schemes are shown in the FIGS. 5-7. In another embodiment, some of the amine moieties (on the dimethacrylate functionalized urethane) can be reacted with the fluorine containing molecules with other can be reacted with molecules that contain phosphorus, silicon, sulfur, and the like. Some of these alternative functionalization schemes are shown in the FIGS. 5-7 above.

The fluorinated non-isocyanate urethane methacrylate can be used in a variety of different applications. In one embodiment depicted in the FIG. 11, it can be used to coat surfaces and to control the hydrophobicity of the surface.

With reference now once again to the FIGS. 1-3, it may be seen that the bridging moieties $R_1$, $R_2$ and $R_3$ can be selected from a variety of different organic molecules. The bridging moieties $R_1$, $R_2$ and $R_3$ can be selected from a variety of different organic groups that are shown below.

$R_1$ and/or $R_2$ and/or $R_3$ in the FIGS. 1-3 may be an aromatic organic group, for example, a group of the formula (1):

$$-A^1-Y^1-A^2- \quad (1)$$

wherein each of the $A^1$ and $A^2$ is an alkyl group, a cycloalkyl group or a monocyclic divalent aryl group and $Y^1$ is a bridging group that separates $A^1$ and $A^2$. In one embodiment, $Y^1$ can comprise one or two atoms. For example, one atom may separate $A^1$ from $A^2$, with illustrative examples of these groups including —O—, —S—, —S(O)—, —S(O)$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group of $Y^1$ may be a hydrocarbon group or a saturated hydrocarbon group such as methylene, cyclohexlylidene, or isopropylidene.

In another embodiment, the bridging group $Y^1$ may contain 3 or more atoms. Examples of bridging groups that contain 3 or more atoms are $C_2$ to $C_{18}$ alkyl groups, $C_3$ to $C_{18}$ cycloalkyl groups, fused aryl groups, polymeric molecules and the like. Further details are provided below.

In one embodiment, $R_1$ may be derived from dihydroxy compounds having the formula HO—$R_1$—OH, wherein $R_1$ is defined as above for formula (1). The formula HO—$R_1$—OH includes bisphenol compounds of the formula (2):

$$HO\text{-}A^1\text{-}Y^1\text{-}A^2\text{-}OH \quad (2)$$

wherein $Y^1$, $A^1$, and $A^2$ are as described above. For example, one atom may separate $A^1$ and $A^2$. Each $R_1$ may include bisphenol compounds of the general formula (3):

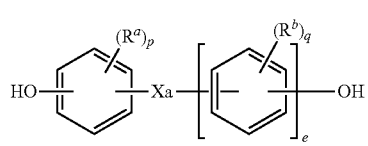

(3)

where $X_a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. For example, the bridging group $X_a$ may be single bond, —O—, —S—, —C(O)—, or a $C_{1-18}$ organic group. The $C_{1-18}$ organic bridging group may be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. $R^a$ and $R^b$ may each represent a halogen, $C_{1-12}$ alkyl group, or a combination thereof. For example, $R^a$ and $R^b$ may each be a $C_{1-3}$ alkyl group, specifically methyl, disposed meta to the hydroxy group on each arylene group. The designation (e) is 0 or 1. The numbers p and q are each independently integers of 0 to 4. It will be understood that $R^a$ is hydrogen when p is 0, and likewise $R^b$ is hydrogen when q is 0.

$X_a$ may be substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. This may include methylene, cyclohexylmethylene, ethylidene, neopentylidene, isopropylidene, 2-[2.2.1]-bicycloheptylidene, cyclohexylidene, cyclopentylidene, cyclododecylidene, and adamantylidene. A specific example wherein $X_a$ is a substituted cycloalkylidene is the cyclohexylidene-bridged, alkyl-substituted bisphenol of formula (4):

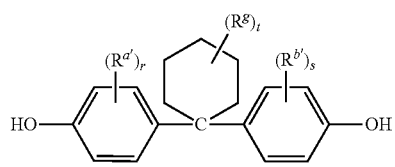

(4)

wherein $R^{a'}$ and $R^{b'}$ are each independently $C_{1-12}$ alkyl, $R^g$ is $C_{1-12}$ alkyl or halogen, r and s are each independently 1 to 4, and t is 0 to 10. $R^{a'}$ and $R^{b'}$ may be disposed meta to the cyclohexylidene bridging group. The substituents $R^{a'}$, $R^{b'}$ and $R^g$ may, when comprising an appropriate number of carbon atoms, be straight chain, cyclic, bicyclic, branched, saturated, or unsaturated. For example, $R^g$ may be each independently $C_{1-4}$ alkyl, $R^g$ is $C_{1-4}$ alkyl, r and s are each 1, and t is 0 to 5. In another example, $R^{a'}$, $R^{b'}$ and $R^g$ may each be methyl, r and s are each 1, and t is 0 or 3. The cyclohexylidene-bridged bisphenol can be the reaction product of two moles of o-cresol with one mole of cyclohexanone. In another example, the cyclohexylidene-bridged bisphenol may be the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol-containing polycarbonates, or a combination comprising at least one of the foregoing with other bisphenol polycarbonates, are supplied by Bayer Co. under the APEC® trade name.

In one embodiment, $X_a$ is a $C_{1-18}$ alkylene group, a $C_{3-18}$ cycloalkylene group, a fused $C_{6-18}$ cycloalkylene group, or a group of the formula —$B_1$—W—$B_2$— wherein $B_1$ and $B_2$ are the same or different $C_{1-6}$ alkylene group and W is a $C_{3-12}$ cycloalkylidene group or a $C_{6-16}$ arylene group.

In another example, $X_a$ may be a substituted $C_{3-18}$ cycloalkylidene of the formula (5):

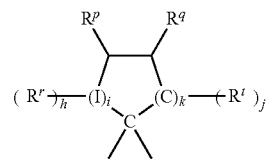

(5)

wherein $R^r$, $R^p$, $R^q$, and $R^t$ are independently hydrogen, halogen, oxygen, or $C_{1-12}$ organic groups; I is a direct bond, a carbon, or a divalent oxygen, sulfur, or —N(Z)— where Z is hydrogen, halogen, hydroxy, $C_{1-12}$ alkyl, $C_{1-12}$ alkoxy, $C_{6-12}$ aryl, or $C_{1-12}$ acyl; h is 0 to 2, j is 1 or 2, i is an integer of 0 or 1, and k is an integer of 0 to 3, with the proviso that at least two of $R^r$, $R^p$, $R^q$ and $R^t$ taken together are a fused cycloaliphatic, aromatic, or heteroaromatic ring. It will be understood that where the fused ring is aromatic, the ring as shown in formula (5) will have an unsaturated carbon-carbon linkage at the junction where the ring is fused. When i is 0, h is 0, and k is 1, the ring as shown in formula (5) contains 4 carbon atoms; when i is 0, h is 0, and k is 2, the ring as shown contains 5 carbon atoms, and when i is 0, h is 0, and k is 3, the ring contains 6 carbon atoms. In one example, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Other useful dihydroxy compounds having the formula HO—$R_1$—OH include aromatic dihydroxy compounds of formula (6):

(6)

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

Bisphenol-type dihydroxy aromatic and bicyclic compounds may include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis(hydroxyphenyl) cyclopentane, 1,1-bis(4-hydroxyphenyl)cyclohexane, 1,1-bis(4-hydroxy-3 methyl phenyl)cyclohexane 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl) fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as a combination comprising at least one of the foregoing dihydroxy aromatic and bicyclic compounds.

Examples of the types of bisphenol compounds represented by formula (2) may include 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl) propane, 3,3-bis(4-hydroxyphenyl)phthalimidine, 2-phenyl-3,3-bis(4-hydroxyphenyl)phthalimidine ("PBPP"), 9,9-bis(4-hydroxyphenyl)fluorene, and 1,1-bis(4-hydroxy-3-methylphenyl)cyclohexane ("DMBPC"). Exemplary polymers and copolymers (that are used in the $R_1$, $R_2$ and/or $R_3$ position) containing polycarbonate units may be derived from bisphenol A.

As detailed above, $R_1$, $R_2$ and/or $R_3$ can be a polymer. In one embodiment, $R_1$ is a polyolefin, a polycarbonate, a polyalkylene glycol, a polyester-carbonate, a polysiloxane, a polycarbonate-siloxane, a poly(meth)acrylate, a poly(meth)acrylate-siloxane, a polyalkyl(meth)acrylate, a polyalkyl (meth)acrylate-siloxane, a polyetherketone, a polysulfone, a polyphosphazene, a polyphosphonate, a polyimide, a polyetherimide, a polyacetal, a polyacrylic, a polystyrene, a polyester, a polyamide, a polyamideimide, a polyarylate, a polyarylsulfone, a polyethersulfone, a polyphenylene sulfide, a polyvinyl chloride, a polyfluoroethylene, a polyether etherketone, a polyether ketone, a polybenzoxazole, a polyoxadiazole, a polybenzothiazinophenothiazine, a polybenzothiazole, a polypyrazinoquinoxaline, a polypyromellitimide, a polyquinoxaline, a polybenzimidazole, a polyoxindole, a polyoxoisoindoline, a polydioxoisoindoline, a polytriazine, a polypyridazine, a polypiperazine, a polypyridine, a polypiperidine, a polytriazole, a polypyrazole, a polypyrrolidine, a polycarborane, a polyoxabicyclononane, a polydibenzofuran, a polyphthalide, a polyanhydride, a polyvinyl ether, a polyvinyl thioether, a polyvinyl alcohol, a polyvinyl ketone, a polyvinyl halide, a polyvinyl nitrile, a polyvinyl ester, a polysulfonate, a polysulfide, a polythioester, a polysulfonamide, a polyurea, a polyphosphazene, a polysilazane, or the like, or a combination thereof.

Resorbable or biodegradable polymers may also be used. These include polylactic-glycolic acid (PLGA), poly-caprolactone (PCL), copolymers of polylactic-glycolic acid and poly-caprolactone (PCL-PLGA copolymer), polyhydroxybutyrate-valerate (PHBV), polyorthoester (POE), polyethylene oxide-butylene terephthalate (PEO-PBTP), poly-D,L-lactic acid-p-dioxanone-polyethylene glycol block copolymer (PLA-DX-PEG), or the like, or a combination thereof.

In one embodiment, $R_1$ and/or $R_2$ and/or $R_3$ is preferably a polycarbonate, a polysiloxane, a polyester carbonate, a polycarbonate-siloxane or a polyester-siloxane. In an embodiment, the polysiloxane is represented by the formula (7):

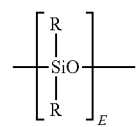

(7)

wherein each R is independently a $C_{1-13}$ monovalent organic group. For example, R can be a $C_1$-$C_{13}$ alkyl, $C_1$-$C_{13}$ alkoxy, $C_2$-$C_{13}$ alkenyl group, $C_2$-$C_{13}$ alkenyloxy, $C_3$-$C_6$ cycloalkyl, $C_3$-$C_6$ cycloalkoxy, $C_6$-$C_{14}$ aryl, $C_6$-$C_{10}$ aryloxy, $C_7$-$C_{13}$ arylalkyl, $C_7$-$C_{13}$ aralkoxy, $C_7$-$C_{13}$ alkylaryl, or $C_7$-$C_{13}$ alkylaryloxy. Combinations of the foregoing R groups can be used in the same copolymer.

The value of E in formula (7) can vary widely depending on the type and relative amount of each component in the flame retardant composition, the desired properties of the composition, and like considerations. Generally, E has an average value of 2 to 1,000, specifically 3 to 500, more specifically 5 to 100. Polysiloxane-carbonate copolymers may also be used in the $R_1$ or $R_2$ or $R_3$ positions.

As noted above, $R_1$ or $R_2$ or $R_3$ may be a polyestercarbonate, also known as a polyester-polycarbonate. The polycarbonate portion may be defined as follows in the formula (8):

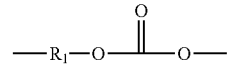

(8)

where $R_1$ is the dihydroxy compound as defined above in the formulas (1), (2) or (6) and wherein at least 60 percent of the total number of R¹ groups may contain aromatic organic groups and the balance thereof are aliphatic or alicyclic, or aromatic groups.

In another embodiment, $R_1$ and/or $R_2$ and/or $R_3$ is a polyester carbonate as shown in the formula (9)

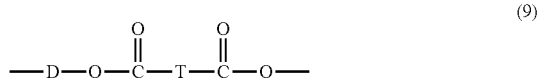

(9)

wherein O-D-O is a divalent group derived from a dihydroxy compound, and D may be, for example, one or more alkyl containing $C_6$-$C_{20}$ aromatic group(s), or one or more $C_6$-$C_{20}$ aromatic group(s), a $C_{2-10}$ alkylene group, a $C_{6-20}$ alicyclic group, a $C_{6-20}$ aromatic group or a polyoxyalkylene group in which the alkylene groups contain 2 to 6 carbon atoms, specifically 2, 3, or 4 carbon atoms. D may be a $C_{2-30}$ alkylene group having a straight chain, branched chain, or cyclic (including polycyclic) structure. O-D-O may be derived from the formulas (1), (2) and (6) above. T of formula (8) may be a divalent group derived from a dicarboxylic acid, and may be, for example, a $C_{2-10}$ alkylene group, a $C_{6-20}$ alicyclic group, a $C_{6-20}$ alkyl aromatic group, a $C_{6-20}$ aromatic group, or a $C_6$ to $C_{36}$ divalent organic group derived from a dihydroxy compound or chemical equivalent thereof. In an embodiment, T is an aliphatic group. T may be derived from a $C_6$-$C_{20}$ linear aliphatic alpha-omega (α-Ω) dicarboxylic ester. Diacids from which the T group in the ester unit of formula (8) is derived include aliphatic dicarboxylic acid from 6 to 36 carbon atoms, optionally from 6 to 20 carbon atoms. The $C_6$-$C_{20}$ linear aliphatic alpha-omega (αΩ) dicarboxylic esters may be derived from adipic acid, sebacic acid, 3,3-dimethyl adipic acid, 3,3,6-trimethyl sebacic acid, 3,3,5,5-tetramethyl sebacic acid, azelaic acid, dodecanedioic acid, dimer acids, cyclohexane dicarboxylic acids, dimethyl cyclohexane dicarboxylic acid, norbornane dicarboxylic acids, adamantane dicarboxylic acids, cyclohexene dicarboxylic acids, $C_{14}$, $C_{18}$ and $C_{20}$ diacids.

While the FIGS. 1-3 do not reflect a fluorinated non-isocyanate urethane dimethacrylate resin, it can be envisioned that the methacrylate functionalized urethanes of the FIG. 3 can be fluorinated as detailed in the FIG. 10 while at the same time having $R_1$, $R_2$ and $R_3$ selected from amongst the foregoing functional groups. In an exemplary embodiment, the bridging moiety $R_1$, $R_2$ and/or $R_3$ is a polysiloxane.

FIGS. 12-19 show various exemplary structures of non-isocyanate acrylates functionalized with fluorine containing molecules, sulfur containing molecules, phosphorus containing molecules and anhydride functionalized molecules. In the FIGS. 12-19A, $R_3$ through $R_{41}$ may be a straight chain or branched $C_{1-30}$ alkyl, a $C_{3-30}$ cycloalkyl, a $C_{6-30}$ aryl, $C_{7-30}$ alkaryl, a $C_{7-30}$ aralkyl, a $C_{1-30}$ heteroalkyl, a $C_{3-30}$ heterocycloalkyl, a $C_{6-30}$ heteroaryl, a $C_{7-30}$ heteroalkaryl, a $C_{7-30}$ heteroaralkyl, a $C_{1-30}$ fluoroalkyl, a $C_{3-30}$ cyclofluoroalkyl, a $C_{6-30}$ aryl where 1 to 5 hydrogen atoms are fluoro-substituted, $C_{7-30}$ fluoro-substituted alkaryl, a $C_{7-30}$ fluoro-substituted aralkyl, a $C_{1-30}$ fluoro-substituted heteroalkyl, a $C_{3-30}$ fluoro-substituted heterocycloalkyl, a $C_{6-30}$ fluoro-substituted heteroaryl, a $C_{7-30}$ fluoro-substituted heteroalkaryl, or a combination comprising at least one of these groups. Preferred values for $R_3$ through $R_{41}$ are shown in the Table 1 below.

The fluorinated non-isocyanate urethane dimethacrylate resin may be used to manufacture a variety of different articles. In one embodiment, the fluorinated non-isocyanate urethane dimethacrylate resin may be used as a coating to control the hydrophobicity/hydrophilicity of surfaces. In another embodiment, the fluorinated non-isocyanate urethane dimethacrylate resin may be partially functionalized with phosphoric acid to impart flame retardancy to other compositions that contain it. The inclusion of phosphonic acid can also impart the self-etching of tooth enamel and/or dentin and adhesion promotion.

In yet another embodiment, the urethane functionalized methacrylate (without the fluorine) can be partially or fully functionalized with phosphoric acid to impart flame retardancy to other compositions that contain it. Such a flame retardant composition could be made so as to be devoid of halogens. The use of polysiloxanes as $R_1$ and/or $R_2$ may be used for the production of non-stick article surfaces if desired.

Figure 19A:
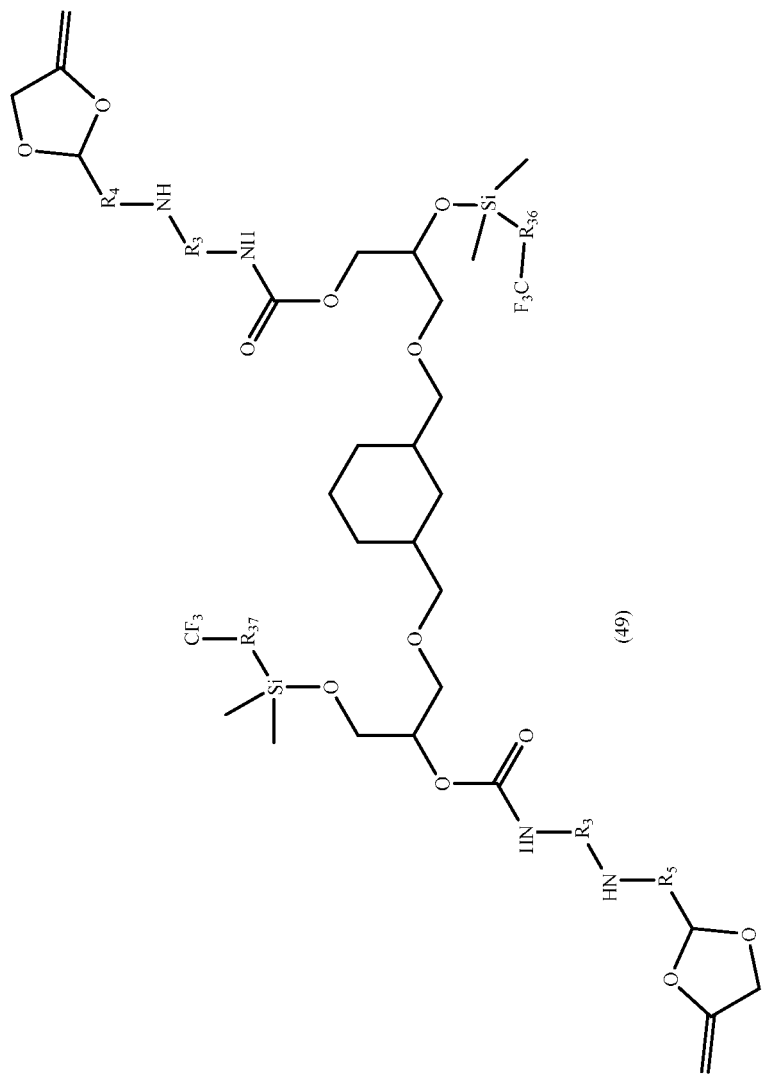
FIG. 19(A) shows an exemplary structure of a non-isocyanate urethane functionalized with silicon, polysiloxane and fluorine containing molecules.
Figure 19B:
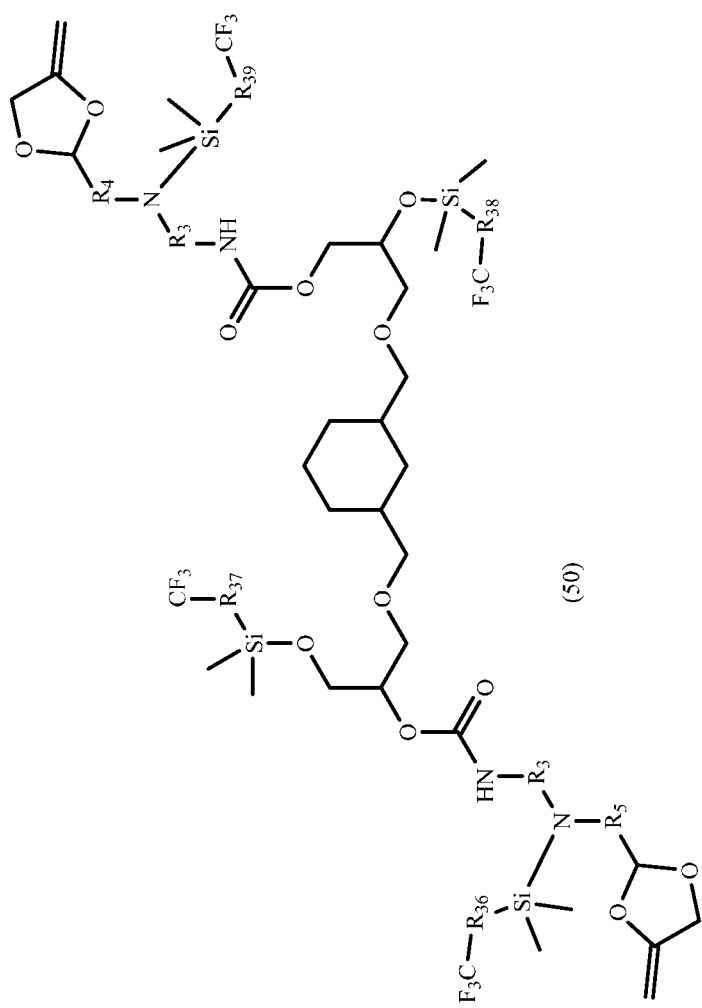
FIG. 19(B) shows an exemplary structure of a non-isocyanate urethane functionalized with silicon, polysiloxane and fluorine containing molecules.

FIGS. 1-19B show various structures labelled 1, 2, 3, and so on till structure 50 in the FIG. 19B. These structures have various groups labelled $R_1$, $R_2$, R, and so on till $R_{41}$ in the FIG. 18. Preferred molecules for each of the structures $R_1$, $R_2$, R, and so on till $R_{41}$ are shown in the Table 1 below.

TABLE 1

| Figure | Designation | Preferred | Chemical Name |
|---|---|---|---|
| 1 | $R_1$ | $CH_3$ | Methyl |
|  | $R_2$ | $CH_2$ | Methylene |
| 2 | $R_3$ | $NH_2$ | 5-amino-1,3,3-trimethyl (cyclohexane methylamine) |
| 5 | $R_4$ | $CH_2$ | Methylene |
|  | $R_5$ | $CH_2$ | Methylene |
| 6 | $R_6$ | $(CH_2)_4$ | Butylene |
| 6A | $R_7$ | $(CH_2)_4$ | Butylene |
|  | $R_8$ | $(CH_2)_4$ | Butylene |
|  | $R_9$ | CF2—CF2 | Tetrafluoroethylene |
|  | $R_{10}$ | CF2—CF2 | Tetrafluoroethylene |
|  | $R_{11}$ | CF2—CF2 | Tetrafluoroethylene |
| 7 | $R_{12}$ | $(CH_2)_3$ | Propylene |
|  | $R_{13}$ | $CH_2$ | Methylene |
| 7A | $R_{14}$ | $(CH_2)_4$ | Butylene |
|  | $R_{15}$ | $(CH_2)_4$ | Butylene |
| 7C | $R_{16}$ | $CH_2$ | Methylene |
|  | $R_{17}$ | $CH_2$ | Methylene |
| 11 | $R_{18}$ | $CF_2$—$CF_2$ | Tetrafluoroethylene |
|  | $R_{19}$ | $CF_2$—$CF_2$ | Tetrafluoroethylene |
|  | $R_{20}$ | $CF_2$—$CF_2$ | Tetrafluoroethylene |
| 13 | $R_{21}$ | $(CH_2)_4$ | Butylene |
|  | $R_{22}$ | $(CH_2)_4$ | Butylene |
|  | $R_{23}$ | $(CH_2)_4$ | Butylene |
| 14 | $R_{24}$ | $CH_2$ | Methylene |
|  | $R_{25}$ | $CH_2$ | Methylene |
|  | $R_{26}$ | $CH_2$ | Methylene |
| 15 | $R_{27}$ | $(CH_2)_4$ | Butylene |
|  | $R_{28}$ | $(CH_2)_4$ | Butylene |
|  | $R_{29}$ | $(CH_2)_4$ | Butylene |
| 16 | $R_{30}$ | $CH_2$ | Methylene |
|  | $R_{31}$ | $CH_2$ | Methylene |
| 16A | $R_{32}$ | $CH_2$ | Methylene |
|  | $R_{33}$ | $CH_2$ | Methylene |
| 17 | $R_{34}$ | $CH_2$ | Methylene |
|  | $R_{35}$ | $CH_2$ | Methylene |
| 18 | $R_{36}$ | $CF_2$—$CF_2$ | Tetrafluoroethylene |
|  | $R_{37}$ | $CF_2$—$CF_2$ | Tetrafluoroethylene |
|  | $R_{38}$ | $CF_2$—$CF_2$ | Tetrafluoroethylene |
|  | $R_{39}$ | $CF_2$—$CF_2$ | Tetrafluoroethylene |
|  | $R_{40}$ | $CF_2$—$CF_2$ | Tetrafluoroethylene |
|  | $R_{41}$ | $CF_2$—$CF_2$ | Tetrafluoroethylene |

As stated above, FIGS. 1-19A show various structures labelled 1, 2, 3, and so on till structure 50 in the FIG. 19A. The names of these structures are provided in the parenthesis in the Table 2 below when they contain the preferred entity shown in the Table 1. For example, when the compound (1) of the FIG. 1 has R1 as being a methylene group then its name is given in the parenthesis as 3-methyl-7-oxabicycloheptane. The preferred structure for conducting the reaction involving compound (1) in the FIG. 1 is therefore 3-methyl-7-oxabicycloheptane. All FIGS. 1-19A are to be viewed in this manner for preferred substituents (as shown Table 1) and preferred molecules shown in parenthesis in the Table 2 below.

TABLE 2

| FIG. | Compound | Chemical Name (preferred molecule) |
|---|---|---|
| 1 | 1 | $R_1$-Cyclohexyl Epoxide (3-methyl-7-oxabicycloheptane) |
|   | 2 | $R_1$-Cyclohexyl Anhydride (5-methylhexahydrobenzo[d][1,3]dioxol-2-one) |
|   | 3 | $R_1$-Dicyclohexyl epoxide (di(7-oxabicycloheptan-3-yl)methane) |
|   | 4 | $R_1$-Dicyclohexyl Dianhydride (5,5'-methylenebis(hexahydrobenzo[d][1,3]dioxol-2-one)) |
|   | 5 | $R_1$-Epoxide (2-methyloxirane) |
|   | 6 | $R_1$-Anhydride (4-methyl-1,3-dioxolan-2-one) |
|   | 7 | $R_1$-Diepoxide (di(oxiran-2-yl)methane) |
|   | 8 | $R_1$-Dianhydride (4,4'-methylenebis(1,3-dioxolan-2-one)) |
| 2 | 2 | $R_1$-Cyclohexyl anhydride (5-methylhexahydrobenzo[d][1,3]dioxol-2-one) |
|   | 9 | Amino, 1,3,-trimethyl(cyclohexyl) methylene urethane (2-hydroxy-4-methylcyclohexyl (3-(aminomethyl)-3,5,5-trimethylcyclohexyl)carbamate) |
|   | 4 | $R_1$-Dianhydride (5,5'-methylenebis(hexahydrobenzo[d][1,3]dioxol-2-one)) |
|   | 10 | Diamino urethane (methylenebis(6-hydroxycyclohexane-3,1-diyl) bis((3-(aminomethyl)-3,5,5-trimethylcyclohexyl)carbamate)) |
|   | 6 | $R_1$-Anhydride (4-methyl-1,3-dioxolan-2-one) |
|   | 11a | Isomers of Amino urethane alcohols (3-hydroxy-2-methylpropyl (3-(aminomethyl)-3,5,5-trimethylcyclohexyl)carbamate) |
|   | 11b | Isomers of Amino urethane alcohols (2-hydroxypropyl (3-(aminomethyl)-3,5,5-trimethylcyclohexyl)carbamate) |
|   | 8 | $R_1$-Dianhydride (4,4'-methylenebis(1,3-dioxolan-2-one)) |
|   | 12a | Diamino urethane isomer (2,4-dihydroxypentane-1,5-diyl bis((3-(aminomethyl)-3,5,5-trimethylcyclohexyl)carbamate)) |
|   | 12b | Diamino urethane isomer (2,4-bis(hydroxymethyl)pentane-1,5-diyl bis((3-(aminomethyl)-3,5,5-trimethylcyclohexyl)carbamate)) |
|   | 12c | Diamino urethane isomer (2-hydroxy-4-(hydroxymethyl)pentane-1,5-diyl bis((3-(aminomethyl)-3,5,5-trimethylcyclohexyl)carbamate)) |
| 3 | 9 | Amino, 1,3,-trimethyl(cyclohexyl) methylene urethane ((2-hydroxy-4-methylcyclohexyl (3-(aminomethyl)-3,5,5-trimethylcyclohexyl)carbamate)) |
|   | 13 | Diamino urethane cyclamate cyclohexyl alcohol (2-hydroxy-4-methylcyclohexyl (3,3,5-trimethyl-5-((((4-methylene-1,3-dioxolan-2-yl)methyl)amino)methyl)cyclohexyl)carbamate) |
|   | 10 | Diamino urethane (methylenebis(6-hydroxycyclohexane-3,1-diyl) bis((3-(aminomethyl)-3,5,5-trimethylcyclohexyl)carbamate)) |
|   | 14 | methylenebis(6-hydroxycyclohexane-3,1-diyl) bis((3,3,5-trimethyl-5-((((4-methylene-1,3-dioxolan-2-yl)methyl)amino)methyl)cyclohexyl)carbamate) |
|   | 11a | Isomers of amino urethane alcohols (3-hydroxy-2-methylpropyl (3-(aminomethyl)-3,5,5-trimethylcyclohexyl)carbamate) |
|   | 15a | 3-hydroxy-2-methylpropyl (3,3,5-trimethyl-5-((((4-methylene-1,3-dioxolan-2-yl)methyl)amino)methyl)cyclohexyl)carbamate |
|   | 11b | Isomers of amino urethane alcohols (2-hydroxypropyl (3-(aminomethyl)-3,5,5-trimethylcyclohexyl)carbamate) |
|   | 15b | 2-hydroxypropyl (3,3,5-trimethyl-5-((((4-methylene-1,3-dioxolan-2-yl)methyl)amino)methyl)cyclohexyl)carbamate |
|   | 12a | Diamino urethane isomer (2,4-dihydroxypentane-1,5-diyl bis((3-(aminomethyl)-3,5,5-trimethylcyclohexyl)carbamate)) |
|   | 16a | 2,4-Dihydroxypentane-1,5-diyl bis((3,3,5-trimethyl-5-((((4-methylene-1,3-dioxolan-2-yl)methyl)amino)methyl)cyclohexyl)carbamate) |
|   | 12b | Diamino urethane isomer (2,4-bis(hydroxymethyl)pentane-1,5-diyl bis((3-(aminomethyl)-3,5,5-trimethylcyclohexyl)carbamate)) |
|   | 16b | 2,4-bis(hydroxymethyl)pentane-1,5-diyl bis((3,3,5-trimethyl-5-((((4-methylene-1,3-dioxolan-2-yl)methyl)amino)methyl)cyclohexyl)carbamate) |
|   | 12c | Diamino urethane isomer (2-hydroxy-4-(hydroxymethyl)pentane-1,5-diyl bis((3-(aminomethyl)-3,5,5-trimethylcyclohexyl)carbamate)) |
|   | 16c | 2-Hydroxy-4-(hydroxymethyl)pentane-1,5-diyl bis((3,3,5-trimethyl-5-((((4-methylene-1,3-dioxolan-2-yl)methyl)amino)methyl)cyclohexyl)carbamate) |
| 4 | 9 | Amino, 1,3,-trimethyl(cyclohexyl) methylene urethane ((2-hydroxy-4-methylcyclohexyl (3-(aminomethyl)-3,5,5-trimethylcyclohexyl)carbamate)) |

TABLE 2-continued

| FIG. | Compound | Chemical Name (preferred molecule) |
|---|---|---|
| | 17 | 2-Hydroxy-4-methylcyclohexyl ((5-((methacryloyloxy)amino)-1,3,3-trimethylcyclohexyl)methyl)carbamate |
| | 10 | Diamino urethane (methylenebis(6-hydroxycyclohexane-3,1-diyl) bis((3-(aminomethyl)-3,5,5-trimethylcyclohexyl)carbamate)) |
| | 18 | Methylenebis(6-hydroxycyclohexane-3,1-diyl) bis(((5-((methacryloyloxy)amino)-1,3,3-trimethylcyclohexyl)methyl)carbamate) |
| | 11a | Isomers of Amino urethane alcohols (3-hydroxy-2-methylpropyl (3-(aminomethyl)-3,5,5-trimethylcyclohexyl)carbamate) |
| | 19a | 3-Hydroxy-2-methylpropyl (2-(5-((methacryloyloxy)amino)-1,3,3-trimethylcyclohexyl)ethyl)carbamate |
| | 11b | Isomers of Amino urethane alcohols (2-hydroxypropyl (3-(aminomethyl)-3,5,5-trimethylcyclohexyl)carbamate) |
| | 19b | 2-hydroxypropyl (3-(((methacryloyloxy)amino)methyl)-3,5,5-trimethylcyclohexyl)carbamate |
| | 12a | Diamino urethane isomer (2,4-dihydroxypentane-1,5-diyl bis((3-(aminomethyl)-3,5,5-trimethylcyclohexyl)carbamate)) |
| | 20a | 2,4-dihydroxypentane-1,5-diyl bis(((1,3,3-trimethyl-5-((3-methyl-2-methylenebut-3-en-1-yl)amino)cyclohexyl)methyl)carbamate |
| | 12b | Diamino urethane isomer (2,4-bis(hydroxymethyl)pentane-1,5-diyl bis((3-(aminomethyl)-3,5,5-trimethylcyclohexyl)carbamate)) |
| | 20b | 2,4-Bis(hydroxymethyl)pentane-1,5-diyl bis(((1,3,3-trimethyl-5-((3-methyl-2-methylenebut-3-en-1-yl)amino)cyclohexyl)methyl)carbamate |
| | 12c | Diamino urethane isomer (2-hydroxy-4-(hydroxymethyl)pentane-1,5-diyl bis((3-(aminomethyl)-3,5,5-trimethylcyclohexyl)carbamate)) |
| | 20c | 2-Hydroxy-4-(hydroxymethyl)pentane-1,5-diyl bis(((1,3,3-trimethyl-5-((3-methyl-2-methylenebut-3-en-1-yl)amino)cyclohexyl)methyl)carbamate |
| 5 | 18 | Methylenebis(6-hydroxycyclohexane-3,1-diyl) bis(((5-((methacryloyloxy)amino)-1,3,3-trimethylcyclohexyl)methyl)carbamate) |
| | 21 | Methylenebis(6-(((4-methylene-1,3-dioxolan-2-yl)methoxy)cyclohexane-3,1-diyl) bis(((5-((methacryloyloxy)amino)-1,3,3-trimethylcyclohexyl)methyl)carbamate) |
| 6 | 13 | Diamino urethane cyclamate cyclohexyl alcohol (2-hydroxy-4-methylcyclohexyl (3,3,5-trimethyl-5-(((((4-methylene-1,3-dioxolan-2-yl)methyl)amino)methyl)cyclohexyl)carbamate) |
| | 22 | 2-(4-(Diethoxyphosphoryl)butoxy)-4-methylcyclohexyl ((1,3,3-trimethyl-5-(((4-methylene-1,3-dioxolan-2-yl)methyl)amino)cyclohexyl)methyl)carbamate |
| | 23 | (4-((2-(((((3,3-Dimethyl-5-(((4-methylene-1,3-dioxolan-2-yl)methyl)amino)cyclohexyl)methyl)carbamoyl)oxy)-5-methylcyclohexyl)oxy)butyl)phosphonic acid |
| 6A | 24 | (4-((1-((3-((3-(((((5-(N-(3-(3-(Acryloyloxy)-2-((2,2,3,3,4,4,4-heptafluorobutanoyl)oxy)propoxy)-3-oxopropyl)-2,2,3,3,4,4,4-heptafluorobutanamido)-1,3,3-trimethylcyclohexyl)methyl)carbamoyl)oxy)-2-(4-phosphonobutoxy)propoxy)methyl)cyclohexyl)methoxy)-3-(((((5-(N-(3-(3-(acryloyloxy)-2-(4-phosphonobutoxy)propoxy)-3-oxopropyl)-2,2,3,3,4,4,4-heptafluorobutanamido)-1,3,3-trimethylcyclohexyl)methyl)carbamoyl)oxy)propan-2-yl)oxy)butyl)phosphonic acid |
| 6B | 25 | (4-(2-(((((5-(2,2,3,3,4,4,4-Heptafluoro-N-((4-methylene-1,3-dioxolan-2-yl)methyl)butanamido)-1,3,3-trimethylcyclohexyl)methyl)carbamoyl)oxy)-3-((3-((3-(((((5-(2,2,3,3,4,4,4-heptafluoro-N-((4-methylene-1,3-dioxolan-2-yl)methyl)butanamido)-1,3,3-trimethylcyclohexyl)methyl)carbamoyl)oxy)-2-(4-phosphonobutoxy)propoxy)methyl)cyclohexyl)methoxy)propoxy)butyl)phosphonic acid |
| 7A | 13 | Diamino urethane cyclamate cyclohexyl alcohol (2-hydroxy-4-methylcyclohexyl (3,3,5-trimethyl-5-(((((4-methylene-1,3-dioxolan-2-yl)methyl)amino)methyl)cyclohexyl)carbamate) |
| | 26 | 2-(4-(Hydroxydimethylene-l6-sulfanyl)butoxy)-4-methylcyclohexyl ((1,3,3-trimethyl-5-(((4-methylene-1,3-dioxolan-2-yl)methyl)amino)cyclohexyl)methyl)carbamate |
| | 27 | 5-Methyl-2-(((((1,3,3-trimethyl-5-(((4-methylene-1,3-dioxolan-2-yl)methyl)amino)cyclohexyl)methyl)carbamoyl)oxy)cyclohexyl 2-(2,5-dioxotetrahydrofuran-3-yl)acetate |
| 7B | 28 | 4-((1-((3-((3-(((((5-(N-(3-(3-(Acryloyloxy)-2-((2,2,3,3,4,4,4-heptafluorobutanoyl)oxy)propoxy)-3-oxopropyl)-2,2,3,3,4,4,4-heptafluorobutanamido)-1,3,3-trimethylcyclohexyl)methyl)carbamoyl)oxy)-2-(4-sulfobutoxy)propoxy)methyl)cyclohexyl)methoxy)-3-(((((5-(N-(3-(3- |

TABLE 2-continued

| FIG. | Compound | Chemical Name (preferred molecule) |
|---|---|---|
| | | (acryloyloxy)-2-(4-sulfobutoxy)propoxy)-3-oxopropyl)-2,2,3,3,4,4,4-heptafluorobutanamido)-1,3,3-trimethylcyclohexyl)methyl)carbamoyl)oxy)propan-2-yl)oxy)butane-1-sulfonic acid |
| 7C | 29 | 4-((1-(((((5-(2,2,3,3,4,4,4-heptafluoro-N-((4-methylene-1,3-dioxolan-2-yl)methyl)butanamido)-1,3,3-trimethylcyclohexyl)methyl)carbamoyl)oxy)-3-((3-((2-(((((5-(2,2,3,3,4,4,4-heptafluoro-N-((4-methylene-1,3-dioxolan-2-yl)methyl)butanamido)-1,3,3-trimethylcyclohexyl)methyl)carbamoyl)oxy)-3-(4-sulfobutoxy)propoxy)methyl)cyclohexyl)methoxy)propan-2-yl)oxy)butane-1-sulfonic acid |
| 7D | 30 | 3-((3-((2-(2-(2,5-dioxotetrahydrofuran-3-yl)acetoxy)-3-(((((5-(N-(3-(2-(2-(2,5-dioxotetrahydrofuran-3-yl)acetoxy)-3-(methacryloyloxy)propoxy)-3-oxopropyl)-2,2,3,3,4,4,4-heptafluorobutanamido)-1,3,3-trimethylcyclohexyl)methyl)carbamoyl)oxy)propoxy)methyl)cyclohexyl)methoxy)-2-(((((5-(N-(3-(2-(2-(2,5-dioxotetrahydrofuran-3-yl)acetoxy)-3-(methacryloyloxy)propoxy)-3-oxopropyl)-2,2,3,3,4,4,4-heptafluorobutanamido)-1,3,3-trimethylcyclohexyl)methyl)carbamoyl)oxy)propyl 2,2,3,3,4,4,4-heptafluorobutanoate |
| 7E | 31 | 1-((3-((3-(2-(2,5-dioxotetrahydrofuran-3-yl)acetoxy)-2-(((((5-(2,2,3,3,4,4,4-heptafluoro-N-((4-methylene-1,3-dioxolan-2-yl)methyl)butanamido)-1,3,3-trimethylcyclohexyl)methyl)carbamoyl)oxy)propoxy)methyl)cyclohexyl)methoxy)-3-((((((5S)-5-(2,2,3,3,4,4,4-heptafluoro-N-((4-methylene-1,3-dioxolan-2-yl)methyl)butanamido)-1,3,3-trimethylcyclohexyl)methyl)carbamoyl)oxy)propan-2-yl 2-(2,5-dioxotetrahydrofuran-3-yl)acetate |
| 8 | 32 | 4,4'-(((cyclohexane-1,3-diylbis(methylene))bis(oxy))bis(methylene))bis(1,3-dioxolan-2-one) |
| | 33 | 1-((3-((3-(((((5-amino-1,3,3-trimethylcyclohexyl)methyl)carbamoyl)oxy)-2-hydroxypropoxy)methyl)cyclohexyl)methoxy)-3-hydroxypropan-2-yl ((1,3,3,5-tetramethylcyclohexyl)methyl)carbamate |
| 9 | 33 | 1-((3-((3-(((((5-amino-1,3,3-trimethylcyclohexyl)methyl)carbamoyl)oxy)-2-hydroxypropoxy)methyl)cyclohexyl)methoxy)-3-hydroxypropan-2-yl ((1,3,3,5-tetramethylcyclohexyl)methyl)carbamate |
| | 34 | 2-hydroxy-3-((3-((3-(((((1-hydroxy-3-((3-((2-hydroxy-3-(((((5-((3-(2-hydroxy-3-(methacryloyloxy)propoxy)-3-oxopropyl)amino)-1,3,3-trimethylcyclohexyl)methyl)carbamoyl)oxy)propoxy)methyl)cyclohexyl)methoxy)propan-2-yl)oxy)carbonyl)amino)methyl)-3,5,5-trimethylcyclohexyl)amino)propanoyl)oxy)propyl methacrylate |
| 10 | 35 | 2-hydroxyethyl methacrylate |
| | 36 | 2,2,3,4,4,4-hexafluorobutyl methacrylate |
| | 37 | ((3,3'-(((21-hydroxy-5-(hydroxymethyl)-11,11,13,13,15,15-hexamethyl-3,24-dioxo-4,7,12,14,19,23-hexaoxa-2,25-diaza-11,13,15-trisilahexacosane-1,26-diyl)bis(5,5-dimethylcyclohexane-3,1-diyl))bis(azanediyl))bis(propanoyl))bis(oxy))bis(2-hydroxypropane-3,1-diyl) bis(2-methylacrylate) |
| | 38 | NIU-DMA hydrogel |
| 11 | 34 | 2-hydroxy-3-((3-((3-(((((1-hydroxy-3-((3-((2-hydroxy-3-(((((5-((3-(2-hydroxy-3-(methacryloyloxy)propoxy)-3-oxopropyl)amino)-1,3,3-trimethylcyclohexyl)methyl)carbamoyl)oxy)propoxy)methyl)cyclohexyl)methoxy)propan-2-yl)oxy)carbonyl)amino)methyl)-3,5,5-trimethylcyclohexyl)amino)propanoyl)oxy)propyl methacrylate |
| | 39 | A name could not be generated for this structure. |
| 12A | 40 | 1-((3-((3-((2,2,3,3,4,4,4-heptafluorobutanoyl)oxy)-2-(((((1,3,3-trimethyl-5-(((4-methylene-1,3-dioxolan-2-yl)methyl)amino)cyclohexyl)methyl)carbamoyl)oxy)propoxy)methyl)cyclohexyl)methoxy)-3-(((((1,3,3-trimethyl-5-(((4-methylene-1,3-dioxolan-2-yl)methyl)amino)cyclohexyl)methyl)carbamoyl)oxy)propan-2-yl 2,2,3,3,4,4,4-heptafluorobutanoate |
| 12B | 41 | 1-(((((5-(2,2,3,3,4,4,4-heptafluoro-N-((4-methylene-1,3-dioxolan-2-yl)methyl)butanamido)-1,3,3-trimethylcyclohexyl)methyl)carbamoyl)oxy)-3-((3-((2-(((((5-(2,2,3,3,4,4,4-heptafluoro-N-((4-methylene-1,3-dioxolan-2-yl)methyl)butanamido)-1,3,3-trimethylcyclohexyl)methyl)carbamoyl)oxy)-3-((2,2,3,3,4,4,4-heptafluorobutanoyl)oxy)propoxy)methyl)cyclohexyl)methoxy)propan-2-yl 2,2,3,3,4,4,4-heptafluorobutanoate |

TABLE 2-continued

| FIG. | Compound | Chemical Name (preferred molecule) |
|---|---|---|
| 13 | 42 | (4-((1-(methacryloyloxy)-3-((3-((3-(((((1-((3-((3-((((5-((3-(3-(methacryloyloxy)-2-(4-phosphonobutoxy)propoxy)-3-oxopropyl)(4-phosphonobutyl)amino)-1,3,3-trimethylcyclohexyl)methyl)carbamoyl)oxy)-2-(4-phosphonobutoxy)propoxy)methyl)cyclohexyl)methoxy)-3-(4-phosphonobutoxy)propan-2-yl)oxy)carbonyl)amino)methyl)-3,5,5-trimethylcyclohexyl)(4-phosphonobutyl)amino)propanoyl)oxy)propan-2-yl)oxy)butyl)phosphonic acid |
| 14 | 43 | A name could not be generated for this structure. |
| 15 | 44 | A name could not be generated for this structure. |
| 16A | 45 | 2-((perfluorophenyl)methoxy)-3-((3-((3-((perfluorophenyl)methoxy)-2-((((1,3,3-trimethyl-5-(((4-methylene-1,3-dioxolan-2-yl)methyl)amino)cyclohexyl)methyl)carbamoyl)oxy)propoxy)methyl)cyclohexyl)methoxy)propyl ((1,3,3-trimethyl-5-(((4-methylene-1,3-dioxolan-2-yl)methyl)amino)cyclohexyl)methyl)carbamate |
| 16B | 46 | 2-((perfluorophenyl)methoxy)-3-((3-((3-((perfluorophenyl)methoxy)-2-((((1,3,3-trimethyl-5-(((4-methylene-1,3-dioxolan-2-yl)methyl)((perfluorophenyl)methyl)amino)cyclohexyl)methyl)carbamoyl)oxy)propoxy)methyl)cyclohexyl)methoxy)propyl ((1,3,3-trimethyl-5-(((4-methylene-1,3-dioxolan-2-yl)methyl)((perfluorophenyl)methyl)amino)cyclohexyl)methyl)carbamate |
| 17 | 47 | 3-((3-((3-(((((1-((3-((3-((((5-((3-(3-(methacryloyloxy)-2-((perfluorophenyl)methoxy)propoxy)-3-oxopropyl)((perfluorophenyl)methyl)amino)-1,3,3-trimethylcyclohexyl)methyl)carbamoyl)oxy)-2-((perfluorophenyl)methoxy)propoxy)methyl)cyclohexyl)methoxy)-3-((perfluorophenyl)methoxy)propan-2-yl)oxy)carbonyl)amino)methyl)-3,5,5-trimethylcyclohexyl)((perfluorophenyl)methyl)amino)propanoyl)oxy)-2-((perfluorophenyl)methoxy)propyl methacrylate |
| 18 | 48 | A name could not be generated for this structure. |
| 19A | 49 | 2-(((3,3,4,4,5,5,6,6,7,7,8,8,9,9,10,10,10-heptadecafluorodecyl)dimethylsilyl)oxy)-3-((3-((((3,3,4,4,5,5,6,6,7,7,8,8,9,9,10,10,10-heptadecafluorodecyl)dimethylsilyl)oxy)-2-((((1,3,3-trimethyl-5-(((4-methylene-1,3-dioxolan-2-yl)methyl)amino)cyclohexyl)methyl)carbamoyl)oxy)propoxy)methyl)cyclohexyl)methoxy)propyl ((1,3,3-trimethyl-5-(((4-methylene-1,3-dioxolan-2-yl)methyl)amino)cyclohexyl)methyl)carbamate |
| 19B | 50 | 3-((3-((2-(((((5-(((3,3,4,4,5,5,6,6,7,7,8,8,9,9,10,10,10-heptadecafluorodecyl)dimethylsilyl)((4-methylene-1,3-dioxolan-2-yl)methyl)amino)-1,3,3-trimethylcyclohexyl)methyl)carbamoyl)oxy)-3-(((3,3,4,4,5,5,6,6,7,7,8,8,9,9,10,10,10-heptadecafluorodecyl)dimethylsilyl)oxy)propoxy)methyl)cyclohexyl)methoxy)-2-(((3,3,4,4,5,5,6,6,7,7,8,8,9,9,10,10,10-heptadecafluorodecyl)dimethylsilyl)oxy)propyl ((5-(((3,3,4,4,5,5,6,6,7,7,8,8,9,9,10,10,10-heptadecafluorodecyl)dimethylsilyl)((4-methylene-1,3-dioxolan-2-yl)methyl)amino)-1,3,3-trimethylcyclohexyl)methyl)carbamate |

The methods and compositions disclosed herein are exemplified by the following non-limiting examples.

EXAMPLES

Example 1

This example was prepared with the use of a 50:50 wt % blend of bisphenol A glycidyl methacrylate (Bis-GMA) and triethylene-glycol dimethacrylate (TEGDMA). Camphorquinone (CQ) (0.5 wt %) and 2-(dimethylamino)ethyl methacrylate (DMAEMA) (0.5 wt %) were used as a photoinitiator and accelerator respectively. The formulated resin system was mixed thoroughly by stirring for 10 min under $N_2$ atmosphere. The formulation was injected into a mold system comprising a Teflon mold between two glass slides covered with transparent polyethylene film. Samples were irradiated with a visible light curing unit (Rembrandt-Virtuoso Phase II) for 80 seconds on each of the two sides. The wavelength of the light was between 380 and 520 nm with maximal intensity at 470 nm and light intensity was 1500 mW/cm$^2$.

Example 2

This example was prepared with the use of a 50:50 wt % blend of bisphenol A glycidyl methacrylate (Bis-GMA) and triethylene-glycol dimethacrylate (TEGDMA). Bis(2,4,6-trimethylbenzoyl)-phenylphosphineoxide (1 wt %) was used as a photoinitiator. The formulated resin system was mixed thoroughly by stirring for 10 minutes under $N_2$ atmosphere. The formulation was injected into a mold system comprising a Teflon mold between two glass slides covered with transparent polyethylene film. Samples were irradiated with a visible light curing unit (Rembrandt-Virtuoso Phase II) for 80 s on each of the two sides. The wavelength of the light was between 380 and 520 nm with maximal intensity at 470 nm and light intensity was 1500 mW/cm².

Example 3

This example was prepared with the use of a 50:50 wt % blend of nonisocyanate urethane dimethacrylate (NIPUDMA) and triethylene-glycol dimethacrylate (TEGDMA). Bis(2,4,6-trimethylbenzoyl)-phenylphosphineoxide (Irgacure 819) (1 wt %) was used as a photoinitiator. The formulated resin system was mixed thoroughly by stirring for 10 min under $N_2$ atmosphere. The formulation was injected into a mold system comprising a Teflon mold between two glass slides covered with transparent polyethylene film. Samples were irradiated with a visible light curing unit (Rembrandt-Virtuoso Phase II) for 80 s on each of the two sides. The wavelength of the light was between 380 and 520 nm with maximal intensity at 470 nm and light intensity was 1500 mW/cm².

Example 4

This example was prepared with the use of a 50:50 wt % blend of fluorinated nonisocyanate urethane dimethacrylate (NIPUDMA) and triethylene-glycol dimethacrylate (TEGDMA). Bis(2,4,6-trimethylbenzoyl)-phenylphosphineoxide (1 wt %) was used as a photoinitiator. The formulated resin system was mixed thoroughly by stirring for 10 min under $N_2$ atmosphere. The formulation was injected into a mold system comprising a Teflon mold between two glass slides covered with transparent polyethylene film. Samples were irradiated with a visible light curing unit (Rembrandt-Virtuoso Phase II) for 80 s on each of the two sides. The wavelength of the light was between 380 and 520 nm with maximal intensity at 470 nm and light intensity was 1500 mW/cm².

The compositions from Examples 1-4 are shown in the Table 3.

TABLE 3

| | Compositions (wt %) | | | |
|---|---|---|---|---|
| | Example 1 (parts per hundred) | Example 2 (parts per hundred) | Example 3 (parts per hundred) | Example 4 (parts per hundred) |
| Bis-GMA | 50 | 50 | | |
| TEGDMA | 50 | 50 | 50 | 50 |
| NIPU | | | 50 | |
| FNIPU | | | | 50 |
| CQ | 0.5 | | | |
| DMAEMA | 0.5 | | | |
| IRGACURE 819 | | 1 | 1 | 1 |

The properties of the compositions of the Examples 1-4 are shown in the Tables 4-7.

TABLE 4

| | Water absorption study | | | |
|---|---|---|---|---|
| Material | Water Absorption (m3 − m2)/v μg/mm³ | Water solubility (m3 − m1)/v μg/mm³ | Water Absorption (m3 − m2)/m2) × 100% | Water Solubility (m3 − m2)/m2) × 100% |
| Example 1 | 47.8 | 4.25 | 4.06 | 0.37 |
| Example 2 | 49.8 | 0.85 | 4.18 | 0.07 |
| Example 3 | 112.7 | 2.1 | 9.26 | 0.19 |
| Example 4 | | 0.3 | | |

TABLE 5

| | Contact angle-surface energy | | |
|---|---|---|---|
| Material | Sessile (H₂0) (STDV) | MeI2 (STDV) | Surface energy (STDV) (mN/m) |
| Example 2 | 76 (2.5) | 28 (2.8) | 47.49 (0.9) |
| Example 3 | 70 (1.2) | 32 (1.8) | 48.7 (0.8) |
| Example 4 | 96 (2.0) | 65 (1.0) | 28.4 (0.3) |

TABLE 6

DC % (Degree of conversion %)

| | DC % |
|---|---|
| Example 2 | 56 |
| Example 1 | 45.5 |
| Example 3 | 76.5 |
| Example 4 | 80.3 |

TABLE 7

| Dynamic Mechanical Spectroscopy | | | | | |
|---|---|---|---|---|---|
| | | Run #1 | | Run #2 | |
| | | Storage Modulus (−50° C.) (GPa) | Tan delta (° C.) | Storage Modulus (−50° C.) (GPa) | Tan Delta (° C.) |
| Example 2 | 10 Hz | 4.41 | 169 | 3.85 | 170 |
| | 1 Hz | 4.21 | 159 | 3.93 | 161 |
| | 0.1 Hz | 4.11 | 140 | 3.78 | 153 |
| Example 2 | 10 Hz | 4 | 172 | 4.12 | 174 |
| | 1 Hz | 3.95 | 160 | 4 | 167 |
| | 0.1 Hz | 3.7 | 140 | 3.88 | 157 |
| Example 3 | 10 Hz | 3.74 | 123 | 2.72 | 137 |
| | 1 Hz | 3.74 | 111 | 2.64 | 125 |
| | 0.1 Hz | 3.49 | 96 | 2.52 | 117 |
| Example 3 | 10 Hz | 3.2 | 125 | 2.91 | 140 |
| | 1 Hz | 3.03 | 114 | 2.9 | 131 |
| | 0.1 Hz | 2.9 | 99 | 2.84 | 120 |
| Example 3 | 10 Hz | 3.58 | 121 | | |
| | 1 Hz | 3.52 | 108 | | |
| | 0.1 Hz | 3.26 | 100 | | |
| Example 4 | 10 Hz | 3.07 | 123 | 2.85 | 133 |
| | 1 Hz | 2.94 | 111 | 2.72 | 124 |
| | 0.1 Hz | 2.76 | 98 | 2.67 | 113 |
| Example 4 | 10 Hz | 3.28 | 130 | 2.74 | 133 |
| | 1 Hz | 2.97 | 113 | 2.6 | 124 |
| | 0.1 Hz | 2.76 | 100 | 2.56 | 113 |

From the Tables 4-7 above, it may be seen that the hydrophobicity of the surfaces increases with the fluorination of the dimethacrylate functionalized polyurethane. From the Table 6 it may be seen that the fluorination (Example 4) increases the contact angle substantially over that displayed by non-fluorinated dimethacrylate functionalized polyurethanes (See Examples 2 and 3). In addition, from the Table 7 it may be seen that the introduction of fluorination (Example 4) reduces the glass transition temperature over that displayed by non-fluorinated dimethacrylate functionalized polyurethanes (See Examples 2 and 3). The second run in a dynamic mechanical analysis device illustrates the glass transition increases by about 10 to 15 degrees Centigrade indicating increased crosslinking.

The hydrophobicity lends the group to use in dental restorations, protective coatings, hydrophobic fibers, dental coatings to prevent decay, wire coatings, paints, etc. The unique feature is the toughness of the urethane functionality and the ability to add many different reactive groups including amines, epoxides, maleic anhydride and related functionalities to enable polymerization with radical dependent reactions. Thiol groups may be used to enhance reactions in radical polymerizations as well as protective coatings for gold.

In one embodiment, the fluorinated urethane, the phosphorylated urethane, sulfonated urethane or the anhydride terminated urethane detailed above may be blended with a polymeric resin. Polymeric resins listed above may be used. It may also be used to coat polymeric, metallic or ceramic substrates or mixtures, blends thereof. The fluorinated urethane, the phosphorylated urethane, sulfonated urethane or the anhydride terminated urethane may be crosslinked by radiation or by the use of thermal energy and can be used in coatings, dental resins, dental restoratives, thermosetting resins, or the like. Articles including the aforementioned composition are dental resins, fibers, fiber coatings, abrasion resistant coatings, protective coatings for food storage, or coatings for controlling hydrophobicity.

While this disclosure describes exemplary embodiments, it will be understood by those skilled in the art that various changes can be made and equivalents can be substituted for elements thereof without departing from the scope of the disclosed embodiments. In addition, many modifications can be made to adapt a particular situation or material to the teachings of this disclosure without departing from the essential scope thereof. Therefore, it is intended that this disclosure not be limited to the particular embodiment disclosed as the best mode contemplated for carrying out this disclosure.

The invention claimed is:
1. A composition comprising:
a urethane having a structure shown in the formulas (I) through (XIV):

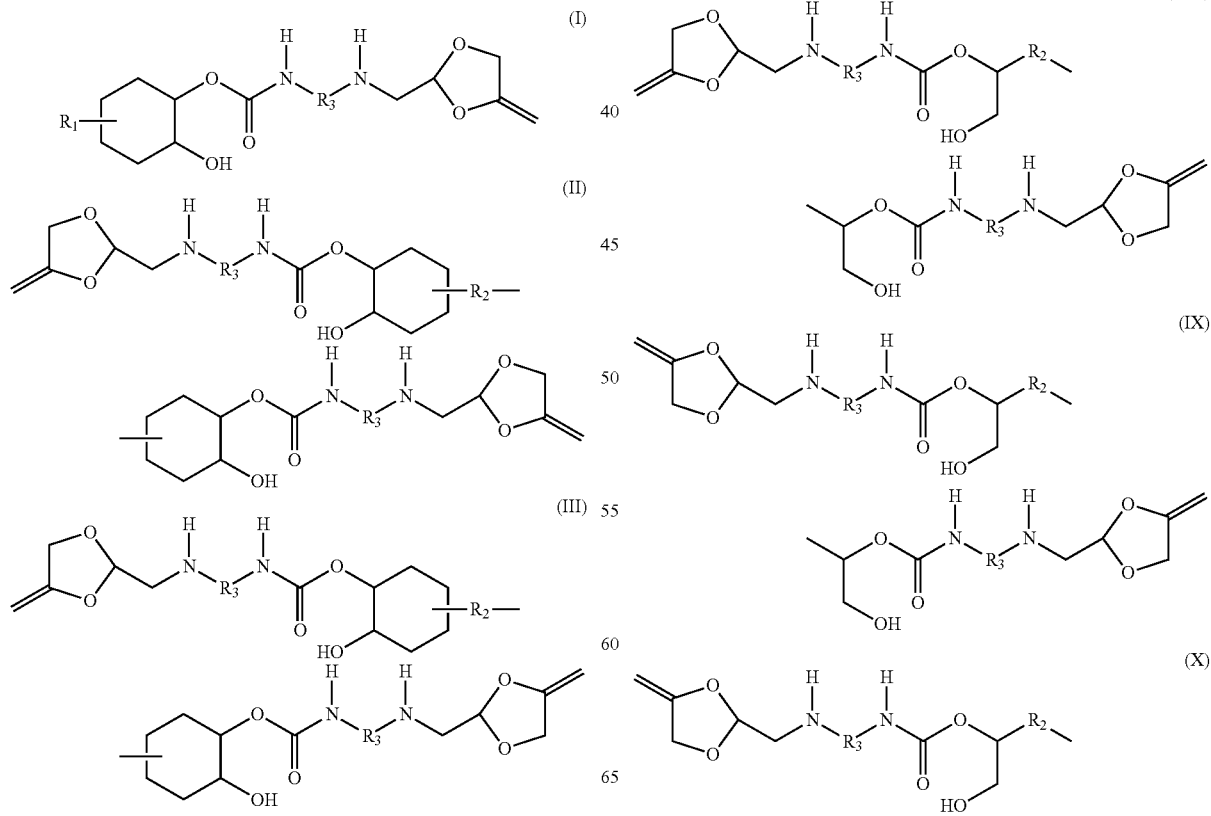

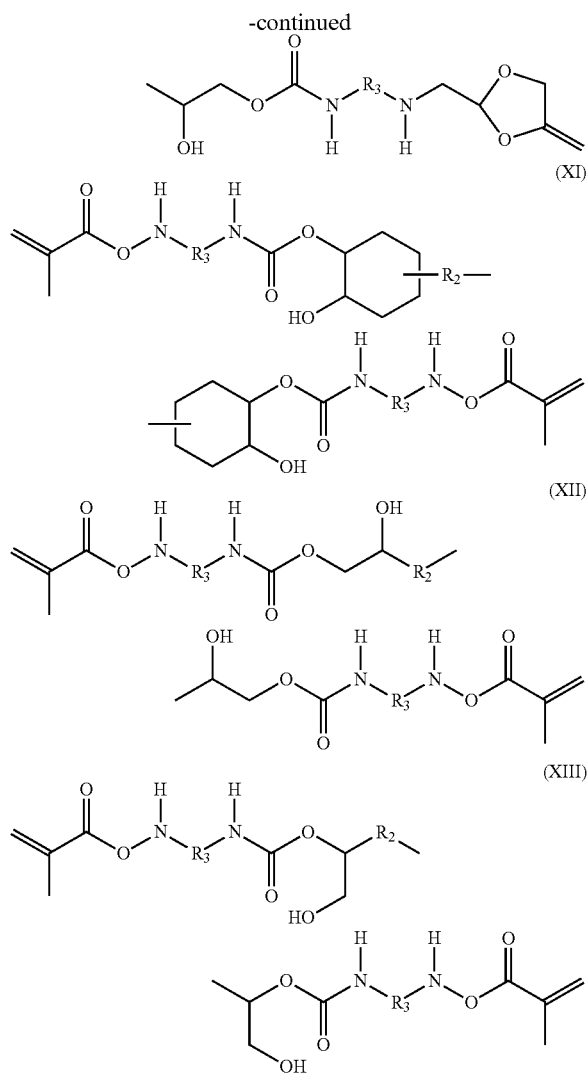
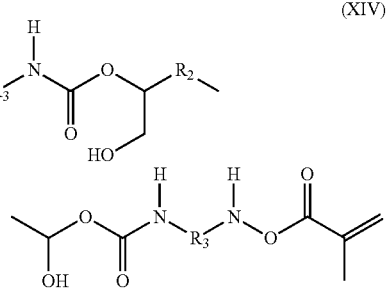

where hydroxyl or amine linkages on the urethane of formulas (I) through (XIV) are functionalized with molecules that contain fluorine atoms, phosphorus atoms, sulfur atoms, unsaturated carboxylic acids, derivatives of unsaturated carboxylic acids, or combinations thereof; and wherein:

$R_1$ is a straight chain or branched $C_{1-30}$ alkyl, a $C_{3-30}$ cycloalkyl, a $C_{6-30}$ aryl, $C_{7-30}$ alkaryl, a $C_{7-30}$ aralkyl, a $C_{1-30}$ heteroalkyl, a $C_{3-30}$ heterocycloalkyl, a $C_{6-30}$ heteroaryl, a $C_{7-30}$ heteroalkaryl, a $C_{7-30}$ heteroaralkyl or a combination comprising at least one of these groups;

$R_2$ is a bridging moiety derived from a straight chain or branched $C_{1-30}$ alkyl, a $C_{3-30}$ cycloalkyl, a $C_{6-30}$ aryl, $C_{7-30}$ alkaryl, a $C_{7-30}$ aralkyl, a $C_{1-30}$ heteroalkyl, a $C_{3-30}$ heterocycloalkyl, a $C_{6-30}$ heteroaryl, a $C_{7-30}$ heteroalkaryl, a $C_{7-30}$ heteroaralkyl or a combination comprising at least one of these groups; and $R_3$ is a bridging moiety derived from a straight chain or branched $C_{1-30}$ alkyl, a $C_{3-30}$ cycloalkyl, a $C_{6-30}$ aryl, $C_{7-30}$ alkaryl, a $C_{7-30}$ aralkyl, a $C_{1-30}$ heteroalkyl, a $C_{3-30}$ heterocycloalkyl, a $C_{6-30}$ heteroaryl, a $C_{7-30}$ heteroalkaryl, a $C_{7-30}$ heteroaralkyl or a combination comprising at least one of these groups.

2. The composition of claim 1, where the urethane has the structure:

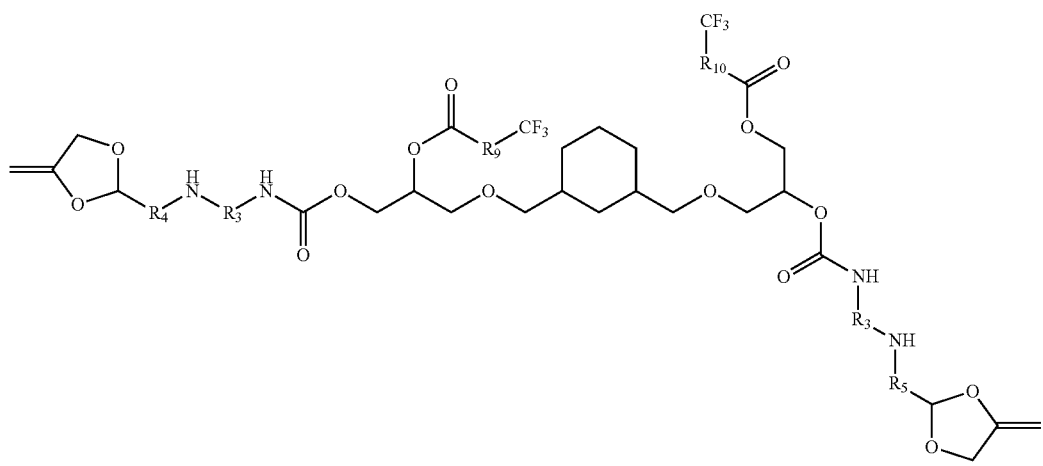

(XVI)
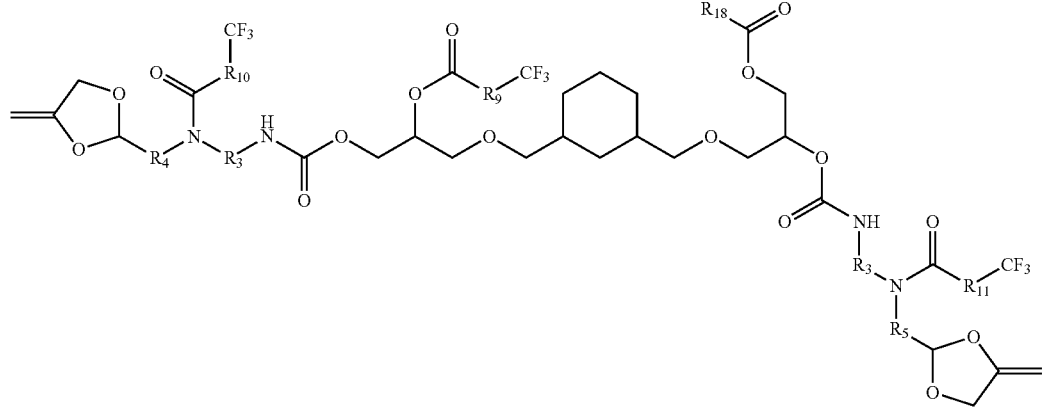
(41)
(XVII)
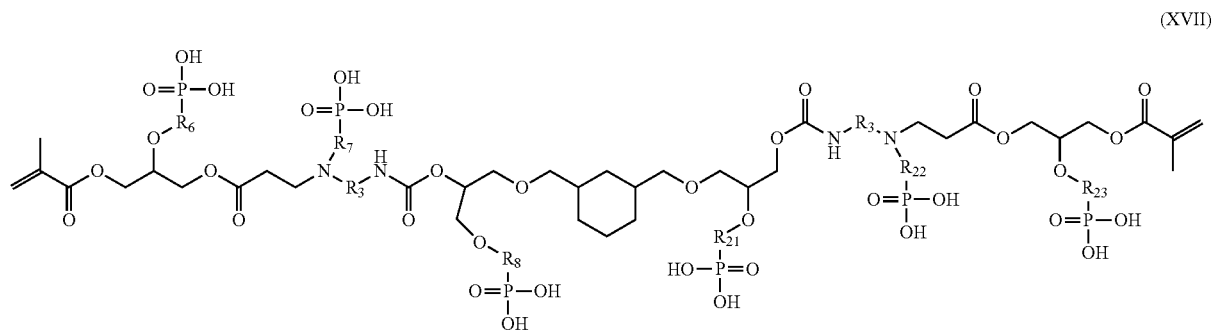
(42)
(XVIII)
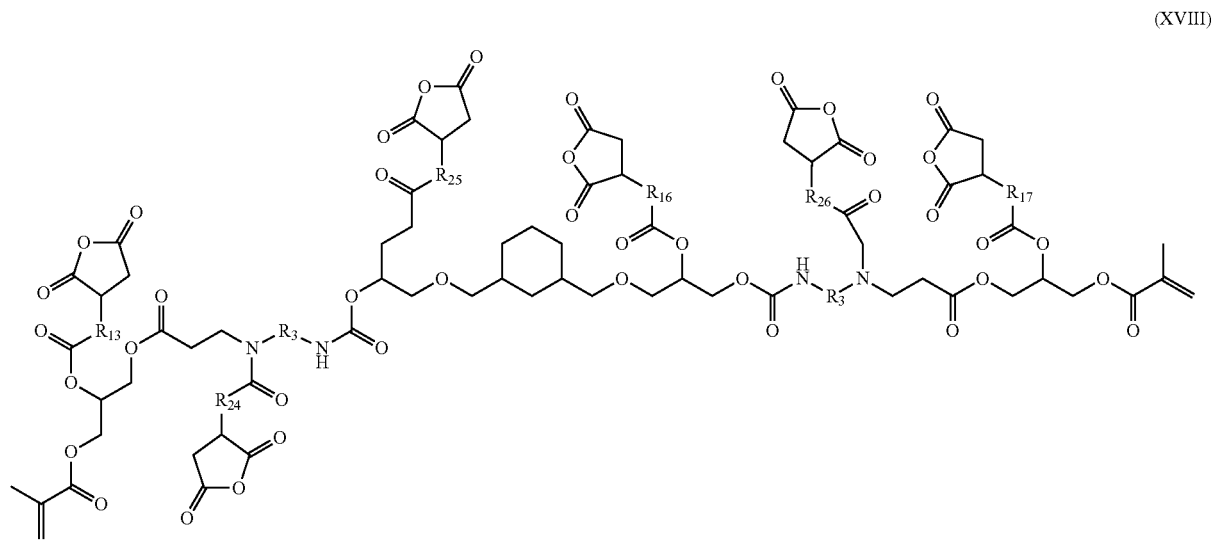
(43)

(XIX)
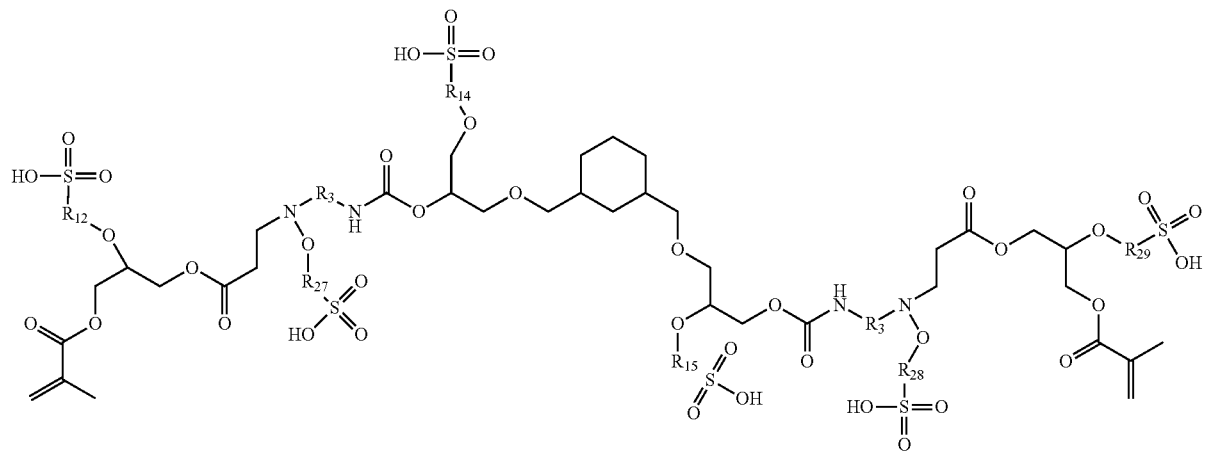
(44)
(XX)
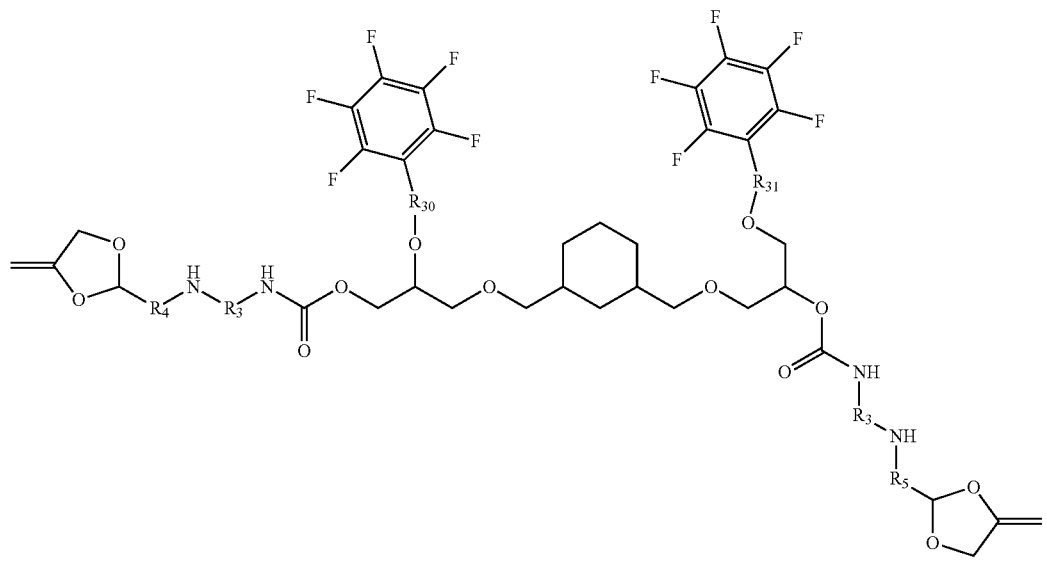
(45)

-continued
(XXI)
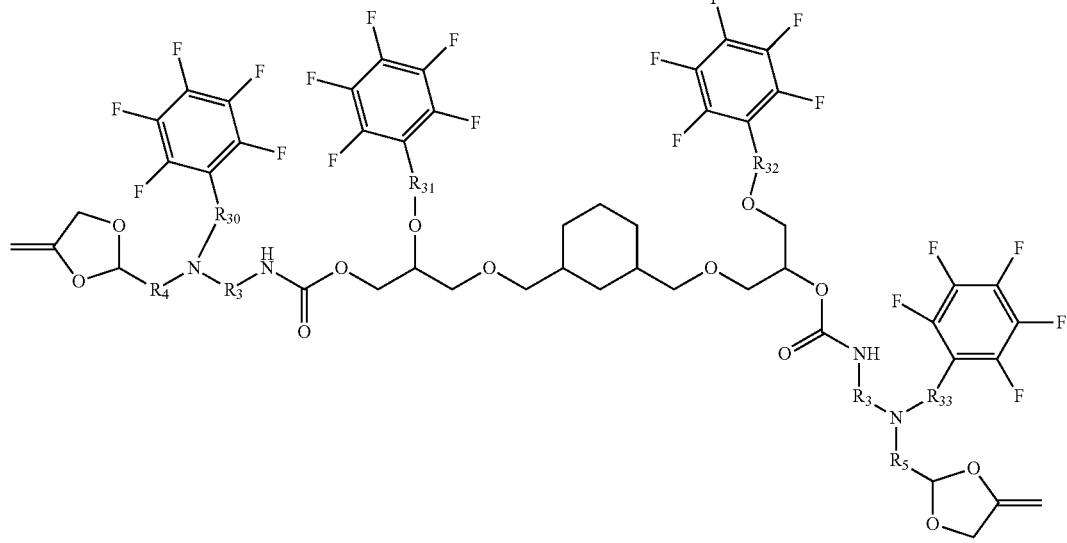
(46)
(XXII)
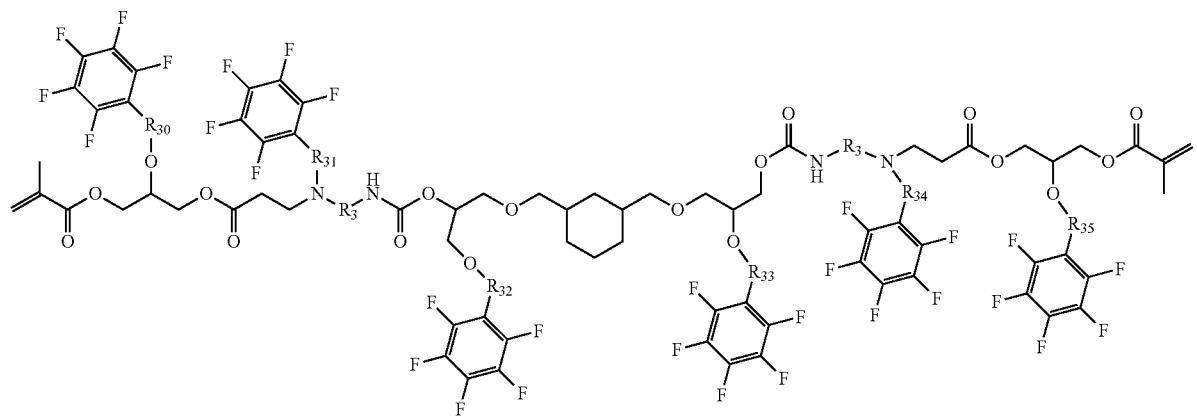
(47)
(XXIII)
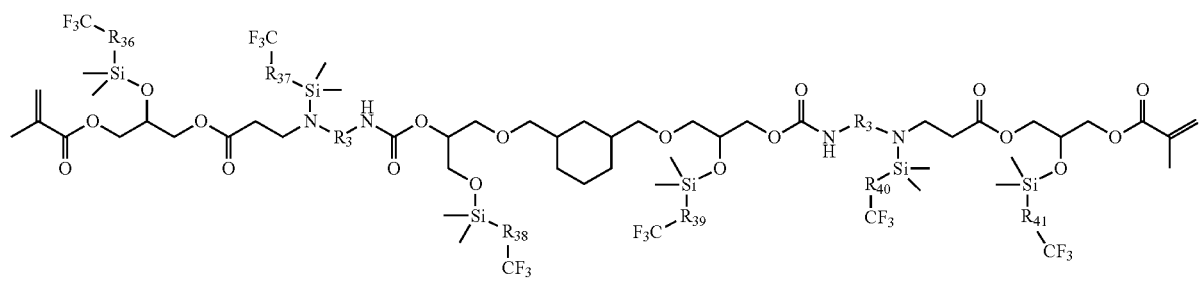
(48)

-continued

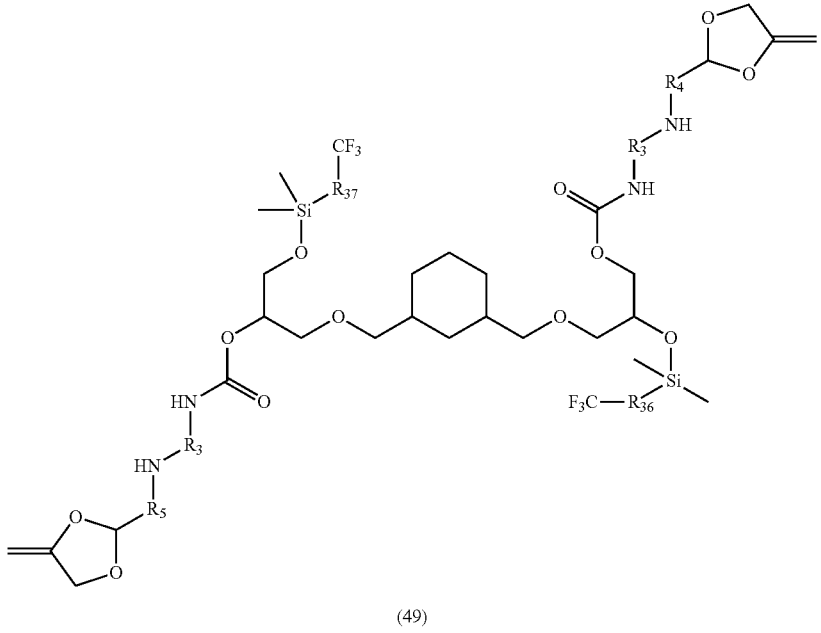

(XXIV)

(49)

wherein in the formulas (XV) through (XXIV), $R_3$ through $R_{41}$ is a bridging moiety derived from are a straight chain or branched $C_{1-30}$ alkyl, a $C_{3-30}$ cycloalkyl, a $C_{6-30}$ aryl, $C_{7-30}$ alkaryl, a $C_{7-30}$ aralkyl, a $C_{1-30}$ heteroalkyl, a $C_{3-30}$ heterocycloalkyl, a $C_{6-30}$ heteroaryl, a $C_{7-30}$ heteroalkaryl, a $C_{7-30}$ heteroaralkyl, a $C_{1-30}$ fluoroalkyl, a $C_{3-30}$ cyclofluoroalkyl, a $C_{6-30}$ aryl where 1 to 5 hydrogen atoms are fluoro-substituted, $C_{7-30}$ fluoro-substituted alkaryl, a $C_{7-30}$ fluoro-substituted heteroalkyl, a $C_{3-30}$ fluoro-substituted heteroalkyl, a $C_{6-30}$ fluoro-substituted heterocycloalkyl, a $C_{7-30}$ fluoro-substituted heteroalkaryl, or a combination comprising at least one of these groups.

3. The composition of claim 1, where the urethane is a fluorinated urethane dimethacrylate.

4. The composition of claim 3, where the fluorinated urethane methacrylate is further functionalized with molecules that contain phosphorus, silicon and/or sulfur.

5. The composition of claim 1, where the urethane is crosslinked.

6. A composition comprising:
a urethane having a structure shown in the formulas (I) through (XIV):

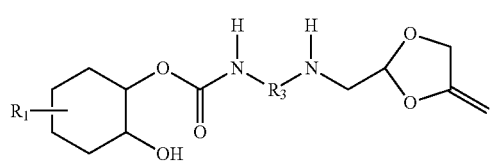

(I)

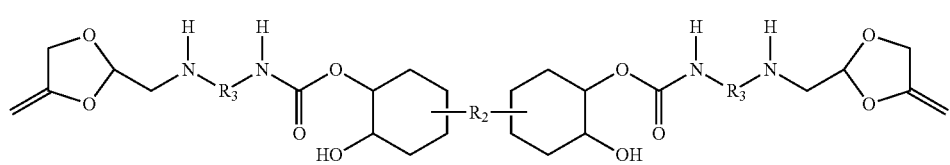

(II)

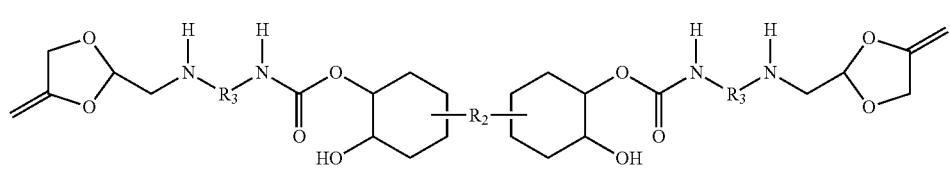

(III)

-continued
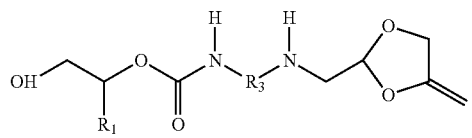 (IV)
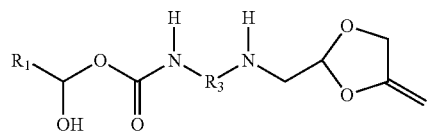 (V)
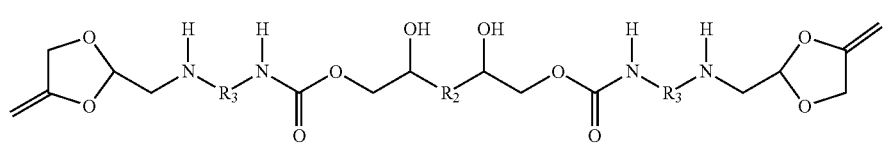 (VI)
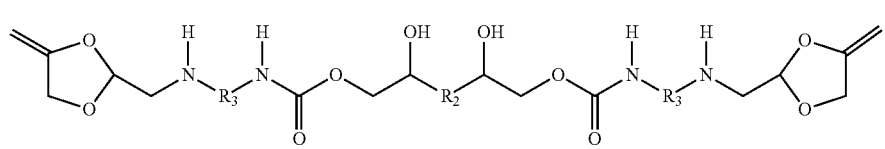 (VII)
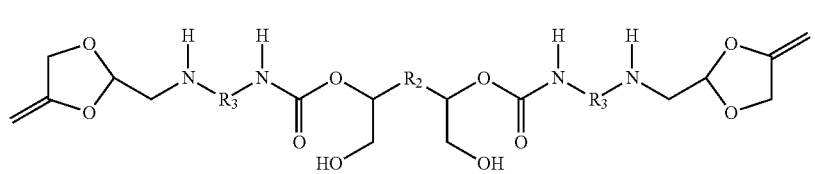 (VIII)
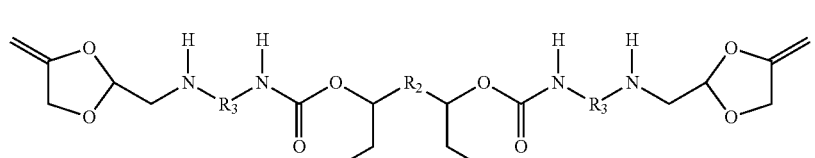 (IX)
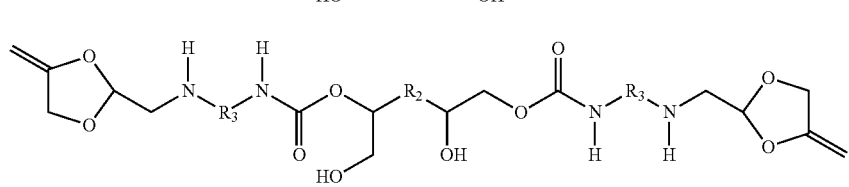 (X)
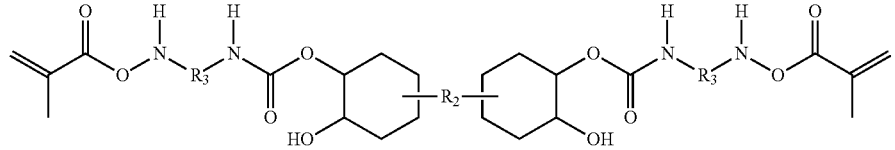 (XI)
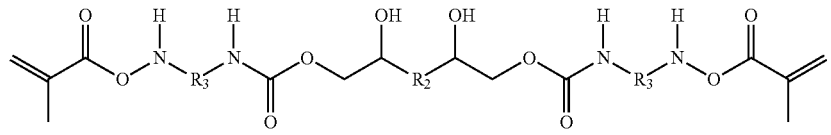 (XII)
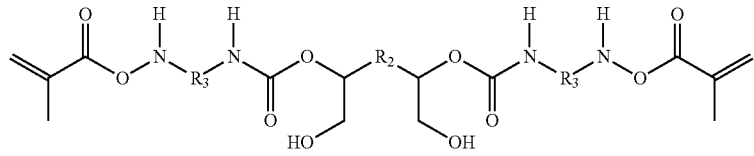 (XIII)
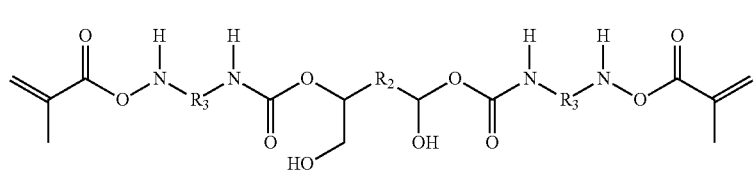 (XIV)

where hydroxyl or amine linkages on the urethane of formulas (I) through (XIV) are functionalized with molecules that contain fluorine atoms, phosphorus atoms, sulfur atoms, unsaturated carboxylic acids, derivatives of unsaturated carboxylic acids, or combinations thereof, and wherein:
- $R_1$ is a straight chain or branched $C_{1-30}$ alkyl, a $C_{3-30}$ cycloalkyl, a $C_{6-30}$ aryl, $C_{7-30}$ alkaryl, a $C_{7-30}$ aralkyl, a $C_{1-30}$ heteroalkyl, a $C_{3-30}$ heterocycloalkyl, a $C_{6-30}$ heteroaryl, a $C_{7-30}$ heteroalkaryl, a $C_{7-30}$ heteroaralkyl, or a combination comprising at least one of these groups;
- $R_2$ is a bridging moiety derived from a straight chain or branched $C_{1-30}$ alkyl, a $C_{3-30}$ cycloalkyl, a $C_{6-30}$ aryl, $C_{7-30}$ alkaryl, a $C_{7-30}$ aralkyl, a $C_{1-30}$ heteroalkyl, a $C_{3-30}$ heterocycloalkyl, a $C_{6-30}$ heteroaryl, a $C_{7-30}$ heteroalkaryl, a $C_{7-30}$ heteroaralkyl, or a combination comprising at least one of these groups; and
- $R_3$ is a bridging moiety derived from a straight chain or branched $C_{1-30}$ alkyl, a $C_{3-30}$ cycloalkyl, a $C_{6-30}$ aryl, $C_{7-30}$ alkaryl, a $C_{7-30}$ aralkyl, a $C_{1-30}$ heteroalkyl, a $C_{3-30}$ heterocycloalkyl, a $C_{6-30}$ heteroaryl, a $C_{7-30}$ heteroalkaryl, a $C_{7-30}$ heteroaralkyl, or a combination comprising at least one of these groups; and a polymeric resin.

7. An article comprising:

a urethane having a structure shown in the formulas (I) through (XIV):

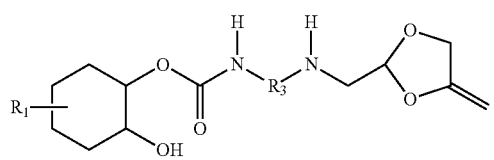

(I)

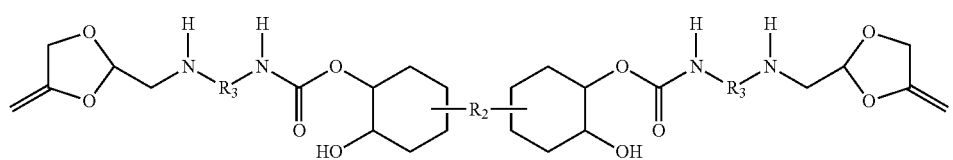

(II)

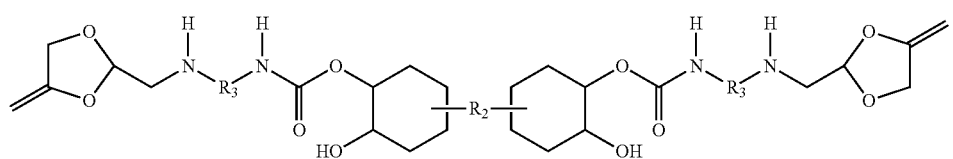

(III)

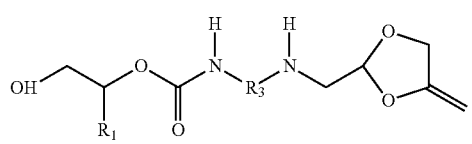

(IV)

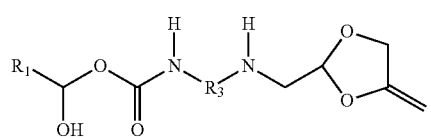

(V)

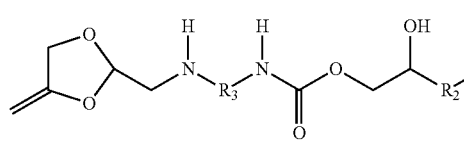

(VI)

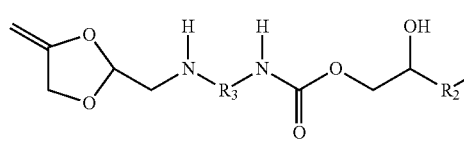

(VII)

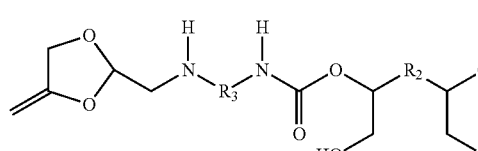

(VIII)

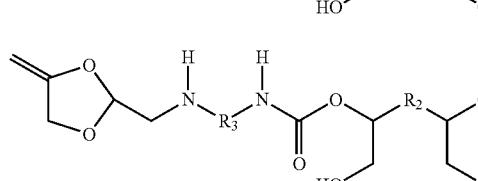

(IX)

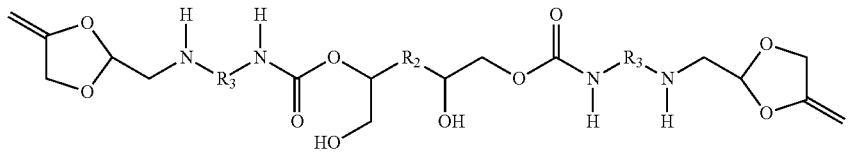
(X)

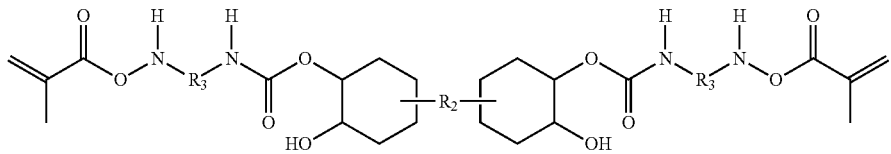
(XI)

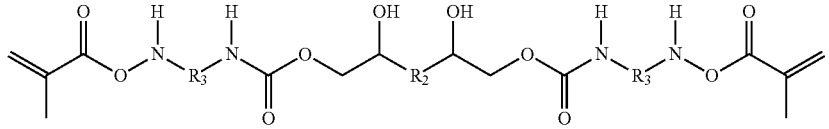
(XII)

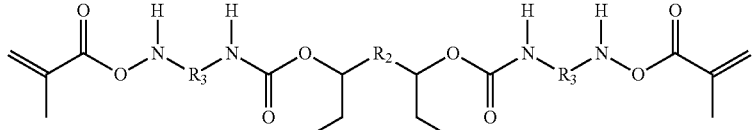
(XIII)

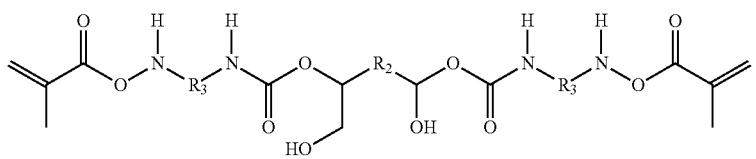
(XIV)

where hydroxyl or amine linkages on the urethane of formulas (I) through (XIV) are functionalized with molecules that contain fluorine atoms, phosphorus atoms, sulfur atoms, unsaturated carboxylic acids, derivatives of unsaturated carboxylic acids, or combinations thereof, and wherein:

- $R_1$ is a straight chain or branched $C_{1-30}$ alkyl, a $C_{3-30}$ cycloalkyl, a $C_{6-30}$ aryl, $C_{7-30}$ alkaryl, a $C_{7-30}$ aralkyl, a $C_{1-30}$ heteroalkyl, a $C_{3-30}$ heterocycloalkyl, a $C_{6-30}$ heteroaryl, a $C_{7-30}$ heteroalkaryl, a $C_{7-30}$ heteroaralkyl, or a combination comprising at least one of these groups;
- $R_2$ is a bridging moiety derived from a straight chain or branched $C_{1-30}$ alkyl, a $C_{3-30}$ cycloalkyl, a $C_{6-30}$ aryl, $C_{7-30}$ alkaryl, a $C_{7-30}$ aralkyl, a $C_{1-30}$ heteroalkyl, a $C_{3-30}$ heterocycloalkyl, a $C_{6-30}$ heteroaryl, a $C_{7-30}$ heteroalkaryl, a $C_{7-30}$ heteroaralkyl, or a combination comprising at least one of these groups; and
- $R_3$ is a bridging moiety derived from a straight chain or branched $C_{1-30}$ alkyl, a $C_{3-30}$ cycloalkyl, a $C_{6-30}$ aryl, $C_{7-30}$ alkaryl, a $C_{7-30}$ aralkyl, a $C_{1-30}$ heteroalkyl, a $C_{3-30}$ heterocycloalkyl, a $C_{6-30}$ heteroaryl, a $C_{7-30}$ heteroalkaryl, a $C_{7-30}$ heteroaralkyl, or a combination comprising at least one of these groups; and a substrate upon which the urethane is disposed.

8. A method comprising:
reacting a cyclic carbonate with a diamine to form a urethane;
reacting the urethane with a methacrylate to form a non-isocyanate urethane methacrylate; and
functionalizing the non-isocyanate urethane methacrylate with a molecule that contains fluorine atoms, phosphorus atoms, sulfur atoms, unsaturated carboxylic acids, derivatives of unsaturated carboxylic acids, or combinations thereof.

9. The method of claim 8, where the non-isocyanate urethane methacrylate is a fluorinated non-isocyanate urethane dimethacrylate.

10. An article comprising:
a urethane having a structure shown in the formulas (I) through (XIV):

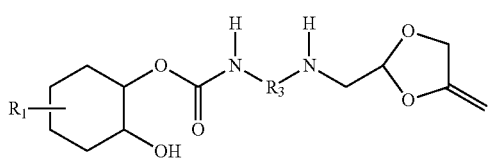
(I)

-continued
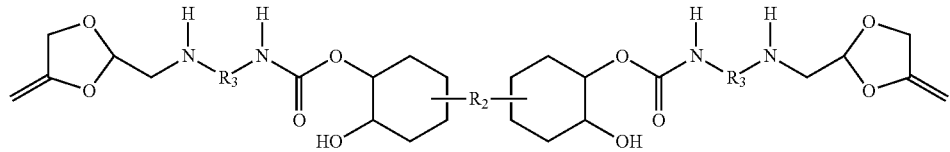
(II)
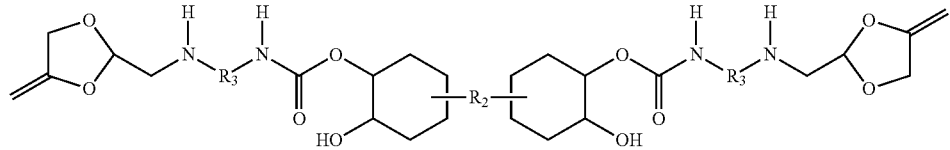
(III)
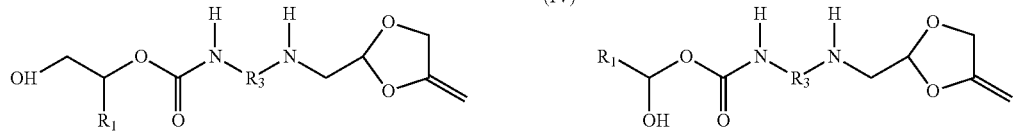
(IV) (V)
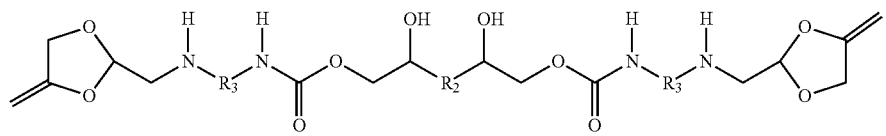
(VI)
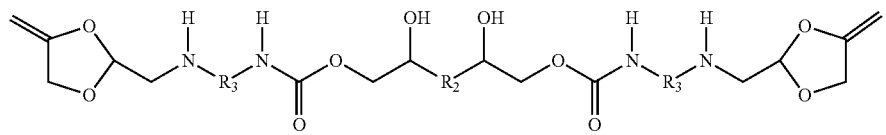
(VII)
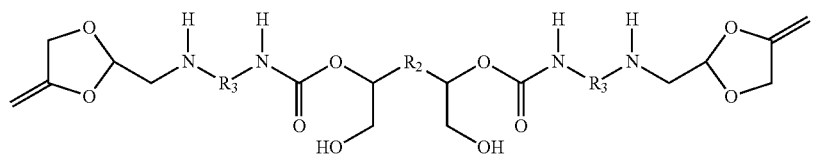
(VIII)
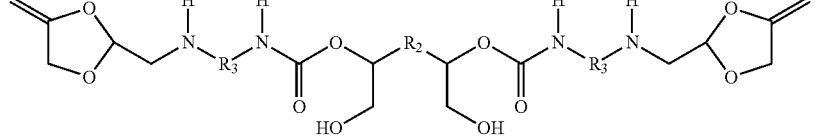
(IX)
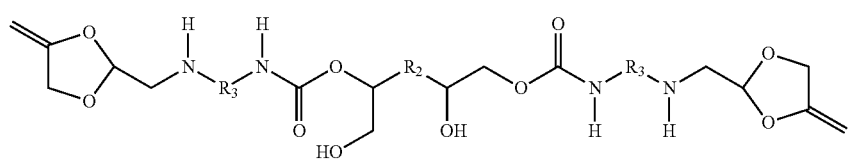
(X)
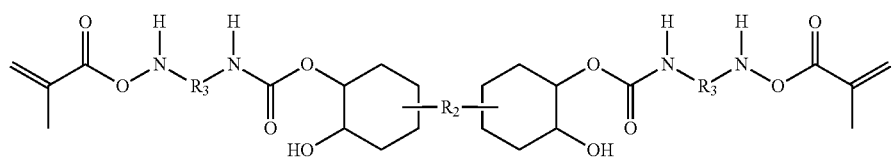
(XI)
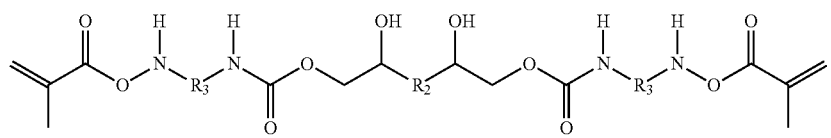
(XII)

-continued

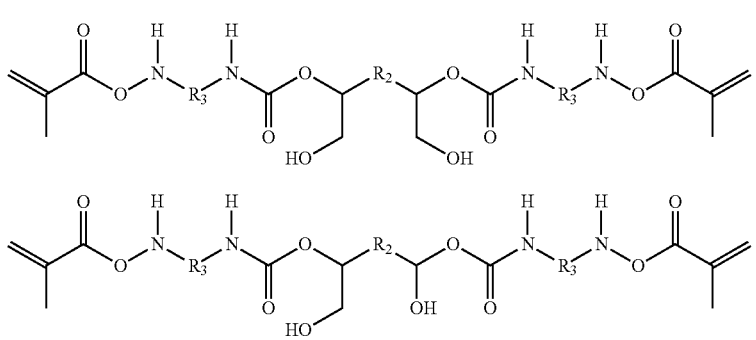

(XIII)

(XIV)

where hydroxyl or amine linkages on the urethane of formulas (I) through (XIV) are functionalized with molecules that contain fluorine atoms, phosphorus atoms, sulfur atoms, unsaturated carboxylic acids, derivatives of unsaturated carboxylic acids, or combinations thereof; and wherein:

$R_1$ is a straight chain or branched $C_{1-30}$ alkyl, a $C_{3-30}$ cycloalkyl, a $C_{6-30}$ aryl, $C_{7-30}$ alkaryl, a $C_{7-30}$ aralkyl, a $C_{1-30}$ heteroalkyl, a $C_{3-30}$ heterocycloalkyl, a $C_{6-30}$ heteroaryl, a $C_{7-30}$ heteroalkaryl, a $C_{7-30}$ heteroaralkyl, or a combination comprising at least one of these groups;

$R_2$ is a bridging moiety derived from a straight chain or branched $C_{1-30}$ alkyl, a $C_{3-30}$ cycloalkyl, a $C_{6-30}$ aryl, $C_{7-30}$ alkaryl, a $C_{7-30}$ aralkyl, a $C_{1-30}$ heteroalkyl, a $C_{3-30}$ heterocycloalkyl, a $C_{6-30}$ heteroaryl, a $C_{7-30}$ heteroalkaryl, a $C_{7-30}$ heteroaralkyl, or a combination comprising at least one of these groups; and $R_3$ is a bridging moiety derived from a straight chain or branched $C_{1-30}$ alkyl, a $C_{3-30}$ cycloalkyl, a $C_{6-30}$ aryl, $C_{7-30}$ alkaryl, a $C_{7-30}$ aralkyl, a $C_{1-30}$ heteroalkyl, a $C_{3-30}$ heterocycloalkyl, a $C_{6-30}$ heteroaryl, a $C_{7-30}$ heteroalkaryl, a $C_{7-30}$ heteroaralkyl, or a combination comprising at least one of these groups.

11. The article of claim 10, where the article is a dental resin, a fiber, a fiber coating, an abrasion resistant coating, a protective coating for food storage, or a coating for controlling hydrophobicity.

* * * * *